United States Patent
Ablah et al.

[11] Patent Number: 5,954,984
[45] Date of Patent: Sep. 21, 1999

[54] HEAT RETENTIVE FOOD SERVINGWARE WITH TEMPERATURE SELF-REGULATING PHASE CHANGE CORE

[75] Inventors: Amil J. Ablah; Brian L. Clothier, both of Wichita, Kans.

[73] Assignee: Thermal Solutions Inc., Wichita, Kans.

[21] Appl. No.: 08/902,803

[22] Filed: Jul. 30, 1997

Related U.S. Application Data

[63] Continuation-in-part of application No. 08/688,987, Jul. 31, 1996, abandoned
[60] Provisional application No. 60/035,815, Jan. 13, 1997, and provisional application No. 60/044,074, Apr. 17, 1997.

[51] Int. Cl.$^6$ .................................. H05B 6/08; H05B 6/12
[52] U.S. Cl. ..................... 219/621; 219/626; 219/665; 219/666; 126/246
[58] Field of Search ..................................... 219/620, 621, 219/622, 624, 647, 663, 649, 666, 730, 759, 625, 626, 665, 634; 126/246, 375, 400; 99/DIG. 14, 451

[56] References Cited

U.S. PATENT DOCUMENTS

| | | |
|---|---|---|
| 1,975,436 | 10/1934 | Sorrel et al. . |
| 1,975,437 | 10/1934 | Sorrel . |
| 1,975,438 | 10/1934 | Sorrel . |
| 3,734,077 | 5/1973 | Murdough et al. . |
| 3,745,290 | 7/1973 | Harnden, Jr. et al. . |
| 3,777,094 | 12/1973 | Peters, Jr. . |
| 3,916,872 | 11/1975 | Kreis et al. ............................. 126/375 |
| 3,978,307 | 8/1976 | Amagami et al. . |
| 3,979,572 | 9/1976 | Ito et al. . |
| 4,020,310 | 4/1977 | Souder, Jr. et al. . |
| 4,110,587 | 8/1978 | Souder, Jr. et al. . |

(List continued on next page.)

FOREIGN PATENT DOCUMENTS

| 6463289 | 3/1989 | Japan . |
|---|---|---|
| 6489273 | 4/1989 | Japan . |

OTHER PUBLICATIONS

Metcal, The SmartHeat Company; Metcal SSC Soldering Cartridges.
Metcal, The SmartHeat Company; Metcal Tips and Accessories.
Metcal, The SmartHeat Company; Metcal STSS Systems.
Seco Products Corporation; Healthcare Mini Catalog.
Seco Products Corporation; System 9–9" Unitized Base.
Seco Products Corporation; System 9–Molded Cover for 9" Unitized Base, System 7–Molded Cover for 7–¾" Unitized Base.

(List continued on next page.)

*Primary Examiner*—Philip H. Leung
*Attorney, Agent, or Firm*—Hovey,Williams, Timmons & Collins

[57] ABSTRACT

A heat retentive, temperature self-regulating, food retaining apparatus (10) includes a body (12), heat retentive core (14) and magnetic induction heating element (16). The body (12) includes a substantially rigid, heatable, food-contacting wall (18) defining a cavity (24). The core (14) is positioned in the cavity (24), and in thermal contact with the wall (18) for selective heating of the wall (18). The core (14) includes a solid state phase change material for storing latent heat during a solid-to-solid phase transformation at a phase transformation temperature. A resilient material is in contact with the phase change material to permit expansion of the phase change material during a phase transformation. The heating element (16) is in thermal contact with the core (14) for heating the core (14) to a temperature above the phase transformation temperature to effect a phase transformation in the phase change material. The element (16) includes a ferromagnetic material responsive to a magnetic field for inducing an electric current in the element (16) to heat the element (16). The ferromagnetic material has a Curie temperature between the phase transformation temperature and the melting temperature of the phase change material. A food warming device (42) includes a heater (44) having a holder (46), a magnetic field generator (48), and a no load detector (50), and a food retaining apparatus (10) positioned on the holder (46).

39 Claims, 7 Drawing Sheets

U.S. PATENT DOCUMENTS

| | | | |
|---|---|---|---|
| 4,115,676 | 9/1978 | Higuchi et al. . | |
| 4,235,282 | 11/1980 | De Filippis et al. | 126/246 |
| 4,246,884 | 1/1981 | Vandas . | |
| 4,256,945 | 3/1981 | Carter et al. . | |
| 4,266,108 | 5/1981 | Anderson et al. . | |
| 4,527,031 | 7/1985 | Aparicio | 219/622 |
| 4,533,807 | 8/1985 | Minamida . | |
| 4,544,818 | 10/1985 | Minamida . | |
| 4,567,877 | 2/1986 | Sepahpur . | |
| 4,572,864 | 2/1986 | Benson et al. . | |
| 4,614,852 | 9/1986 | Matsushita et al. . | |
| 4,625,098 | 11/1986 | Joe . | |
| 4,646,935 | 3/1987 | Ulam . | |
| 4,774,395 | 9/1988 | Yabuuchi et al. . | |
| 4,776,386 | 10/1988 | Meier . | |
| 4,914,267 | 4/1990 | Derbyshire . | |
| 4,982,722 | 1/1991 | Wyatt . | |
| 4,983,798 | 1/1991 | Eckler et al. . | |
| 4,987,828 | 1/1991 | Nuns et al. . | |
| 5,125,391 | 6/1992 | Srivastava et al. . | |
| 5,129,314 | 7/1992 | Hu . | |
| 5,194,708 | 3/1993 | Carter, Jr. | 219/625 |
| 5,202,150 | 4/1993 | Benson et al. . | |
| 5,227,597 | 7/1993 | Dickens et al. | 219/622 |
| 5,254,380 | 10/1993 | Salyer . | |
| 5,424,519 | 6/1995 | Salee . | |
| 5,466,915 | 11/1995 | Meier et al. . | |
| 5,487,329 | 1/1996 | Fissler | 126/375 |
| 5,603,858 | 2/1997 | Wyatt et al. | 219/620 |
| 5,611,328 | 3/1997 | McDermott | 126/246 |
| 5,643,485 | 7/1997 | Potter et al. | 219/621 |

OTHER PUBLICATIONS

Seco Products Corporation; Unitized Base Dispenser.
Seco Products Corporation; System 9–Combination Base/China Dispenser Base/Tray Dispenser.
Carter–Hoffmann Corp.; Patient meal make–up and delivery systems offer you better choices.
Therma–systems Corporation; Solutions Made Easy.

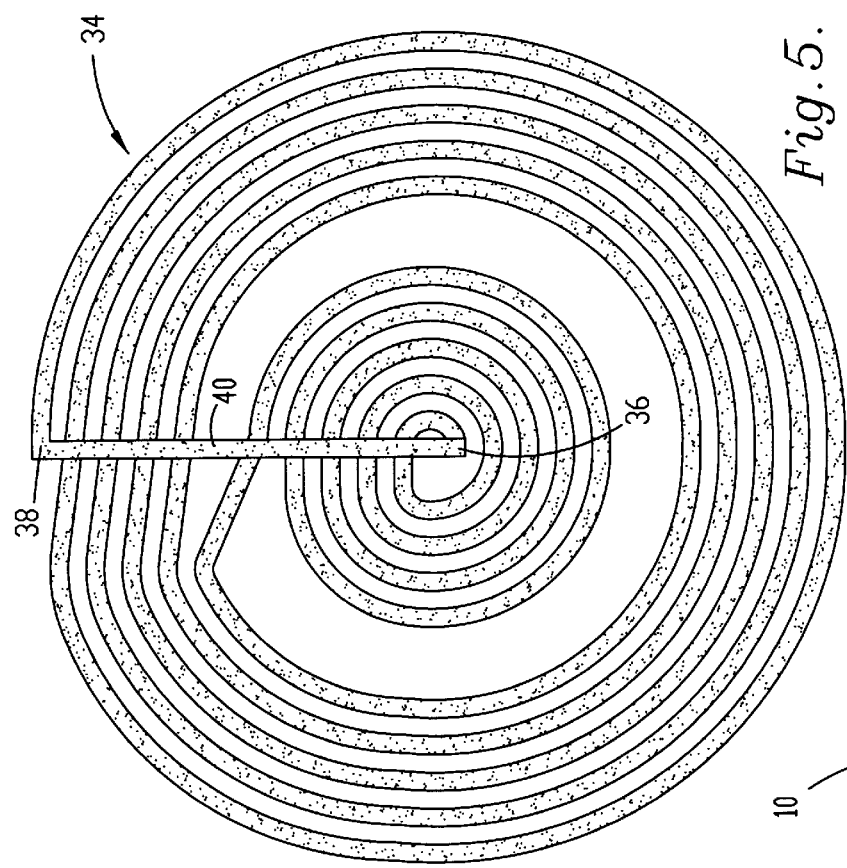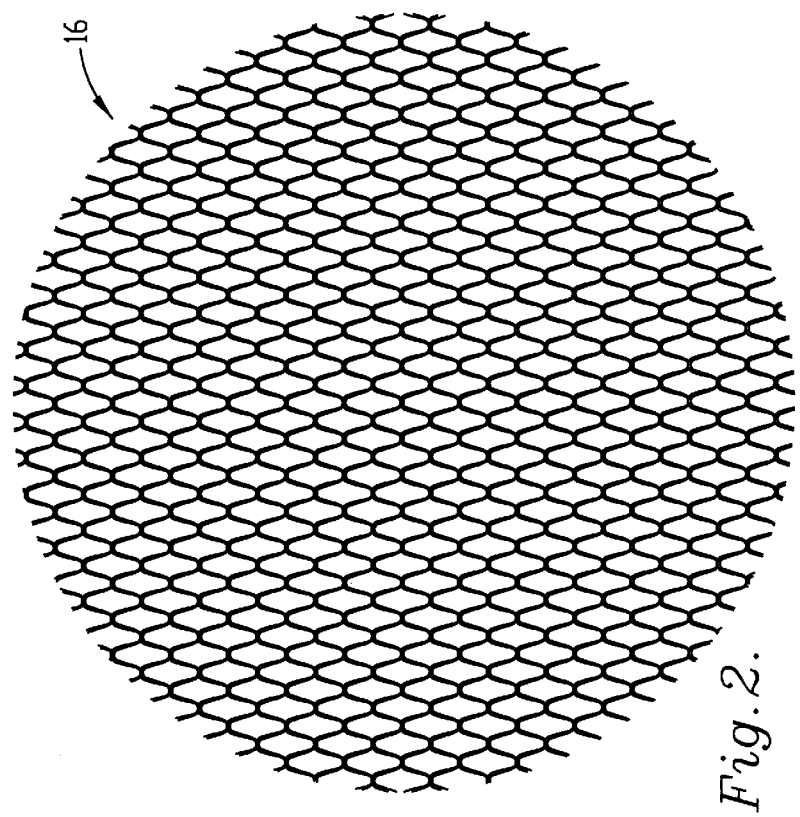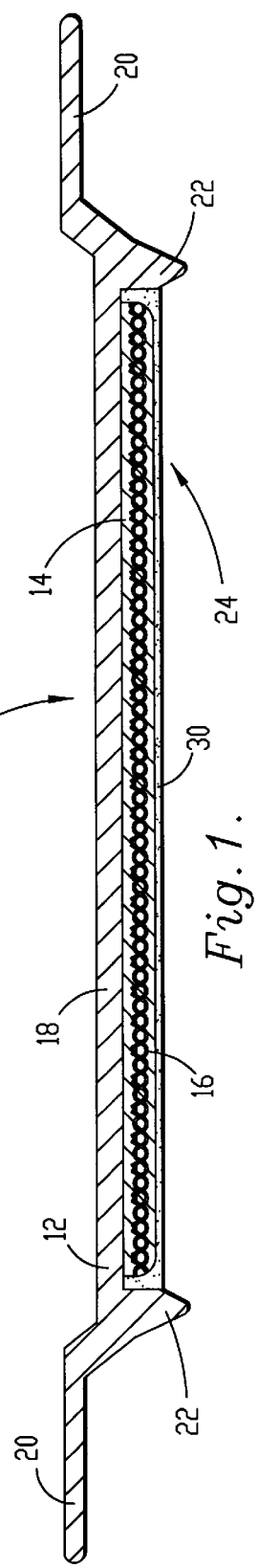

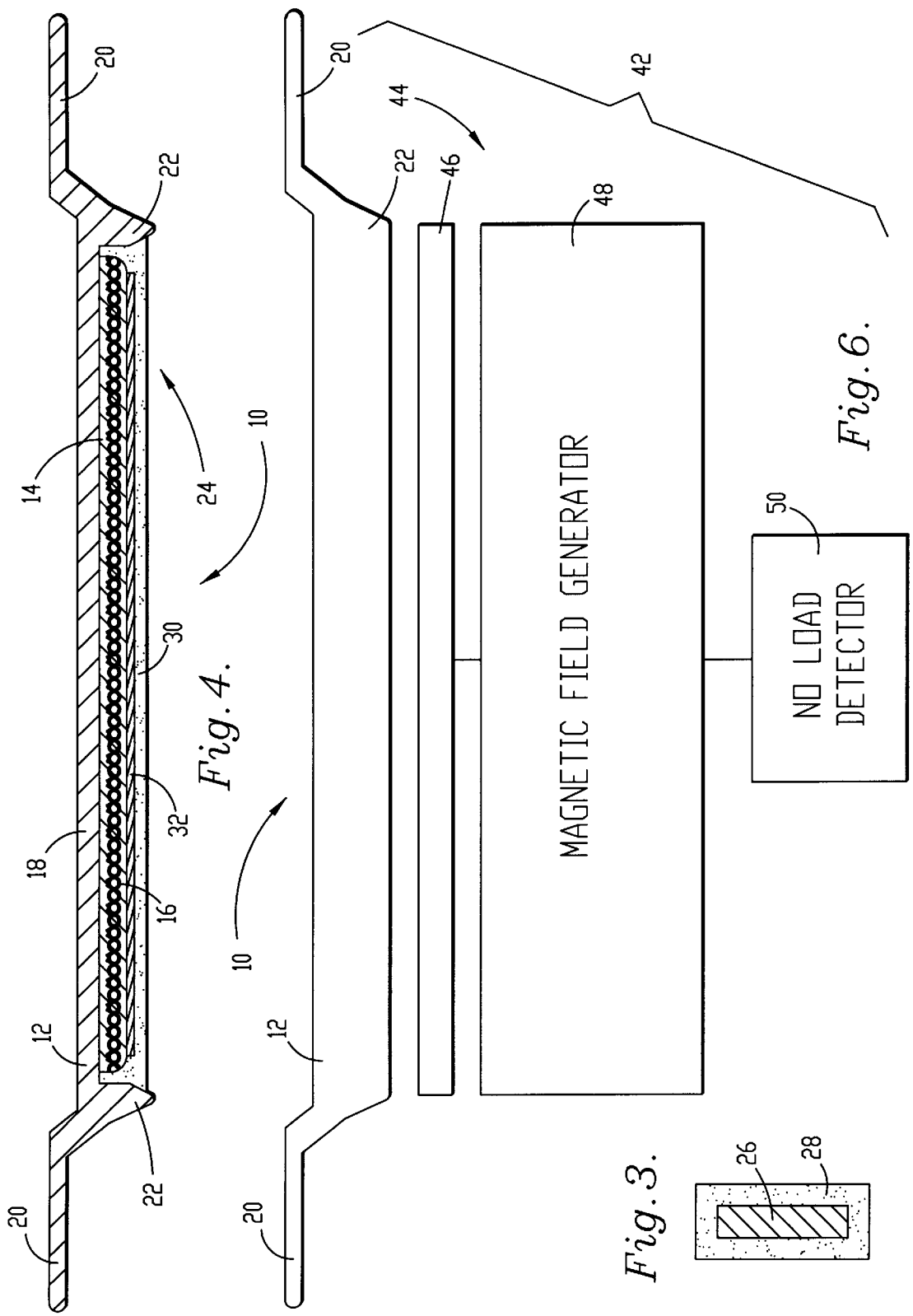

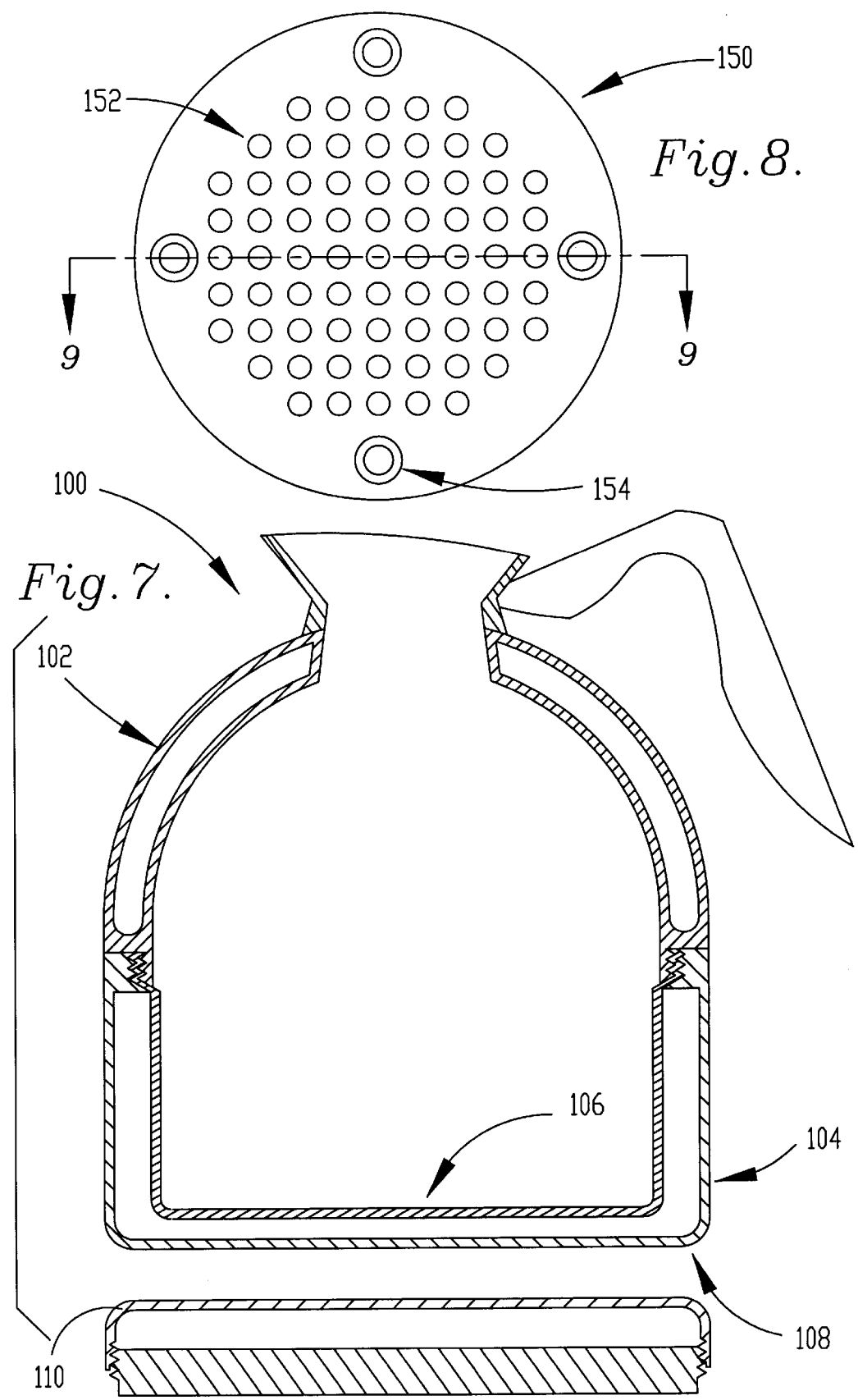

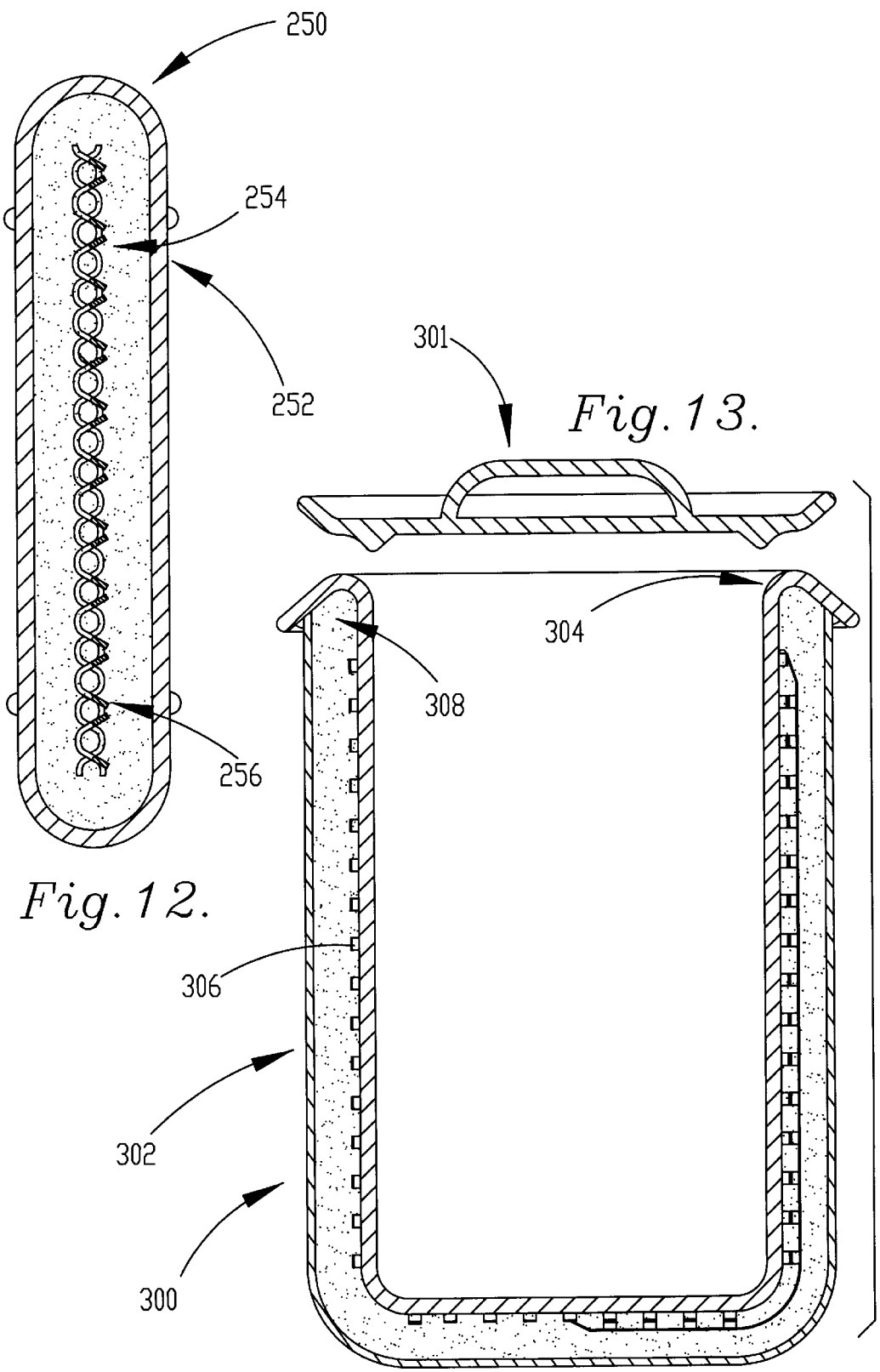

HEAT RETENTIVE FOOD SERVINGWARE WITH TEMPERATURE SELF-REGULATING PHASE CHANGE CORE

RELATED APPLICATION

This is a continuation-in-part of application Ser. No. 08/688,987, filed Jul. 31, 1996, now abandoned and claims the benefit of provisional patent application Nos. 60/035,815 and 60/044,074, filed Jan. 13, 1997 and Apr. 17, 1997, respectively.

BACKGROUND OF THE INVENTION

1. Field of the Invention

The present invention relates to heat retentive food servingware. The preferred servingware of the present invention comprises a heat retentive core including a solid-to-solid phase change material, a resilient material permitting expansion of the phase change material, and an inductive heating element for temperature regulation of the phase change material. The servingware of the invention is capable of temperature self-regulation when heated by a magnetic induction cooking device.

2. Description of the Prior Art

Many food preparers require use of devices for keeping food warm prior to serving and during a meal. Such preparers include institutional food preparers and servers, restaurants, caterers, individual consumers, etc. Institutional food servers such as hospitals, nursing homes, and other similar operations, commonly require a time period between food preparation and serving that can exceed thirty minutes.

Various heat retentive serving devices for keeping food warm until the food can be served are known in the prior art. Heat retentive serving devices generally include a server base and an insulated dome for the base. The most common commercially used server base is designed to support standard dishware for holding food. Prior art examples of such a server base are shown in U.S. Pat. No. 4,246,884 to Vandas, and are available from companies such as the Seco Products Corporation, and the Carter-Hoffman Corporation. Seco Products, for example, manufactures such products under the names "System 7" and "System 9".

The server base is typically comprised of a stainless steel "pellet" or base with some type of heat storage material sealed therein, a synthetic resin underliner for insulation, and a standard ceramic dinner plate resting on the pellet. Common heat storage materials in the pellet include metals and wax.

Prior art heat retentive servers are typically used in the following manner. First, stacks of stainless steel pellets are pre-heated in an oven-type heated pellet dispenser. Simultaneously, stacks of separate dinner plates are heated in the same or a similar heated dispenser. After sufficient heat has been stored in the stainless steel pellets and dishes, the heat retentive servers are assembled during meal make-up.

During such assembly, a worker carefully removes a hot stainless steel pellet using a large suction cup. The worker wears gloves to prevent burns from the hot and highly thermally conductive metal surface. The stainless steel pellet is placed atop a plastic underliner. Next, a heated, dinner plate is placed atop the pellet. This assembly is then sent down a conveyer line where food is placed on the plate. Finally, an insulated dome is coupled with the complete base to cover the food and finalize the server assembly. The food enclosed within the server is kept warm by heat passively released from the heat storage material and by the insulative effect of the dome and underliner.

U.S. Pat. No. 3,557,774 to Kreis, U.S. Pat. No. 3,837,330 to Lanigan et al., and U.S. Pat. No. 4,086,907 to Rothschild disclose examples of server bases having some type of metal or metal alloy as a heat retentive material. Each of the devices disclosed in these references includes variations in the structure of the server base for controlling metal expansion and trapped air expansion within the server base. Although many commercial server bases with metal heat storage material are in use today, they do not keep food hot long enough for many institutional food service operations. For example, due to the storage of only sensible heat, and the low specific heat, high thermal conductivity and high density of metals, these server bases either have to be extremely massive or be pre-heated to severe temperatures to match the performance of server bases using phase change materials.

U.S. Pat. No. 3,148,676 to Truog et al., U.S. Pat. No. 3,734,077 to Murdough et al., and the Vandas reference disclose examples of wax-core server bases using solid-to-liquid phase change materials as a heat storage material. These references disclose a petroleum based, carnauba, or synthetic wax having a relatively high specific heat and a relatively low melting point, such as between about 170–270° F. Structural differences of the devices disclosed in these references include variations of expandable wall designs to prevent rupture of the base upon fusion/expansion of the wax and various means for improving the heat transfer from the wax to the top surface of the server base. Many wax-core server bases are used by institutional food servers today, including the above noted System 7 and System 9 devices manufactured by Seco Products Corporation. Most commercially available wax core heat retentive servers claim to keep food above 140° F. for more than 30 minutes, some for longer than one hour.

Despite the widespread current use of server bases including solid-to-liquid heat retentive cores among institutional food servers, several problems exist. For example, pre-heating of the stainless steel bases takes between one and two hours in commercially available oven-type heated base dispensers, limiting the flexibility of the food service operation. Upon completion of this time and energy consuming process, workers must take the extreme caution in assembling the servers to prevent burns, as noted above.

Several alternative server designs in the prior art have addressed these problems. U.S. Pat. No. 4,982,722 to Wyatt discloses a server base with upper and lower shell walls made from a low thermal conductivity, non-metallic material. An encapsulated heat core of solid-to-liquid phase change material is disposed in the cavity. This design purports to solve the problem of potential burns when removing the server base from an oven-type heater. The required pre-heating time, however, is relatively lengthy. U.S. Pat. No. 4,567,877 to Sepahpur does address the pre-heat time problem. The Sepahpur reference discloses a heat retaining server constructed with all non-metallic materials that is designed to store heat by exposing wet sand encapsulated in its base to microwaves. However, the Sepahpur device does not address the vapor pressure problem encountered when the water therein turns to steam.

Despite prior art attempts to solve the aforementioned pre-heating and safety problems with server bases, these and many other problems with prior art heat retentive servers remain unresolved. For example, prior art heat retentive servers are bulky. In institutional serving application, the bulkiness demands large transport carts for delivery of multiple meals to patients, increasing the costs of equipment, and potentially causing undue strain on workers who deliver them. Prior art heat retentive servers require special washing treatment and special racks for proper drying. Prior art heat retentive server bases also typically comprise multiple pieces that demand extra manpower and time to assemble during meal make-up and demand excessive space to store when not in use. In addition, prior art server bases with long temperature holding times, i.e. with wax core bases, may leak molten wax from their seams during normal use. This problem presents safety hazards to institutional workers and diners.

As a result of these disadvantages, restaurants generally resort to pre-heating standard ceramic dinner plates and/or special metal dishware in cooking ovens. Restaurants also use infrared heaters to keep food warm prior to serving. These methods are relatively inefficient and time consuming. In addition, such methods result in only the outer layer of food being heated, allowing the food to cool and dehydrate significantly prior to being consumed by a patron. Other known servingware heating devices include electrically powered buffets, warming trays, and aluminum heat conductive trays heated by candles, sterno or burners.

It is desirable to have a heat retentive server that to address the problems posed for institutional food servers by prior art servers. It is desirable that a novel server not only be compatible with present commercially available pre-heating equipment, but be capable of being preheated by convenient new methods to significantly decrease preparation time, reduce manpower required, and lessen safety concerns. It is also desirable that a novel heat retentive server and novel pre-heating methods be convenient, efficient, and effective enough to open new markets for their use, i.e. restaurants, caterers and individual consumers. Finally, it is desirable to provide a novel heat retentive server having structural features, especially the heat storage material therein, that is directly transferable to all manner of other servingware for use in all market segments.

To satisfy the above desires, a solid-to-solid phase change material should preferably be used. Many such materials are known. For example, a large number of solid-to-solid phase change materials were evaluated by the National Aeronautics and Space Administration (NASA) during the 1960s as thermal capacitors to passively buffer the temperature swings experienced by earth orbiting satellites. See Hale et al., Phase Change Materials Handbook, NASA Report B72-10464 (August 1972).

Among the hundreds of phase change materials evaluated by NASA were a few materials which exhibited solid-to-solid transformations with large enthalpies. Though these solid state phase change materials were not used in space applications, extensive prior art research data quantify the thermal energy storage properties of a series of solid state phase change materials. Such solid state phase change materials have several potential advantages over the solid-to-liquid phase change materials currently used in prior art heat retentive servers. These possible advantages include less stringent containment requirements, greater design flexibility, and greater potential for efficient heat transfer to and from the phase change material.

U.S. Pat. No. 4,983,798 to Eckler et al., shows a warming device and food storage container using one type of solid-to-solid phase change material, discrete solid particles of pure polyols and polyol mixtures, as the heat storage medium. The Eckler reference discloses that these polyols are lossy at microwave frequencies, particularly at the 2450 MHz frequency of commercial microwave ovens. However, due to the low thermal conductivity of polyols, a modest amount (220 g) of pure polyol, or mixture of pure polyols, requires many hours in a conventional oven to store sufficient heat so as to trigger the solid-to-solid phase transformation throughout the material. Another disadvantage is that discrete particles hinder the ability to ensure good thermal contact with the enclosure and make it difficult to eliminate air pockets that could cause expansion problems upon heating. Furthermore, without compression, discrete particles of polyol require a large volume to store sufficient amounts of energy. Finally, discrete polyol particles will not adhere to other objects. Together, these problems prohibit discrete particles, as described by the Eckler reference, from working as an effective heat retentive core of food servingware.

A solid-to-solid phase change material alone is not enough to satisfy the desires listed above. An alternative method to pre-heat an improved heat retentive server employing a solid-to-solid phase change material is necessary. The preferred alternate heating method is magnetic induction heating. Magnetic induction heating employs alternating magnetic fields such as those produced in an induction coil to induce an electric current in a body including ferromagnetic material placed in the magnetic field. The induced current in the body creates "eddy currents" which then cause the body to undergo joule heating in direct relation to the power, $I^2R$, of the current through the body. The joule heating effect heats the body so that the body may be used to raise the temperature of objects in contact with the body.

The use of magnetic induction as a means of pre-heating an improved heat retentive server allows an important feature not exploited in prior art heat retentive servers. That feature is temperature self-regulation without the need for thermal contact between the server and the magnetic induction heating device. Many commercially available magnetic induction cooking ranges have temperature controls that allow regulation of the temperature of a cooking utensil's bottom surface when the surface is in direct contact with the support surface of the cooking range. Typically, this is done via a feedback circuit using a transducer attached to the underside of the magnetic induction cooktop. By employing a magnetic induction heating element within the server itself that acts as an impedance switch at a designated temperature, in conjunction with the employment of a current limiting switch inherent in today's magnetic induction cooking devices, a novel heat retentive server may be constructed that is temperature self-regulating without direct heating of its bottom surface.

Temperature self-regulating magnetic induction heating elements are known and have been used in furnaces and electric soldering equipment. The following discussion highlights the theory behind these prior art elements. When a ferromagnetic metal reaches or exceeds a critical temperature, referred to as the Curie temperature, $T_c$, the relative magnetic permeability, $\mu_r$, of the material drops rapidly from a value of between about 100 and 1000, depending upon the metal or alloy, to a value of about 1. This automatic, reversible, switch-like change in relative magnetic permeability directly affects the concentration of induced eddy current flow in a ferromagnetic heating element. Induced eddy currents flow primarily along the surface of the element with the induced current density, $j(x)$, decreasing exponentially as a function of the distance from the surface of the element, x. This exponential relationship between current density, $j(x)$, and the distance from the surface of the heating element, x, is given by Equation 1:

$$j(x) = j_0 e^{-x/\delta} \quad (1)$$

where $j_0$ is the current density at the surface of the element, and $\delta$ is a property dependent upon the material composition of the element known as the skin depth. The larger the skin depth of a particular heating element, the less concentrated the induced current is at the surface of the element. The skin depth $\delta$, in mks units, is given by Equation 2:

$$\delta = (2\rho/\omega\mu)^{1/2} \quad (2)$$

where $\omega$ is the angular frequency of the applied field in seconds$^{-1}$, $\rho$ is the electrical resistivity of the element in ohm-m, and $\mu$ is the magnetic permeability of the element. It is convenient to talk in terms of the relative permeability, $\mu_r$, where $\mu_r$ is the permeability normalized to the magnetic permeability of vacuum, $\mu_v$, where $\mu_v$ equals $4\pi \times 10^{-7}$ Wb/A-m. Thus, $\mu_r = \mu/\mu_v = \mu/4\pi \times 10^{-7}$ Wb/A-m. For non-magnetic materials, $\mu_r = 1$.

Now assume that the frequency and the magnitude of the induced current in the induction heating element are kept constant (by regulating the frequency and current in the primary winding of the magnetic induction heating device). Below the Curie temperature, the relative magnetic permeability, $\mu_r$, of the heating element is relatively high. Therefore, the skin depth of the element is small. Prior to the temperature of the heating element reaching the Curie temperature, the induced current flowing through the element is highly concentrated in the surface region of the element. This high concentration provides a relatively small path for the current flow through, increasing the resistance of the element. As a result, the joule heating rate of the heating element is high and the heating element heats rapidly below the Curie temperature.

Once the element is heated above the Curie temperature, where the relative magnetic permeability of the element has dropped to 1, the induced current flowing through the heating element is permitted to spread further into the interior of the element. The resultant lower concentration of current reduces the resistance. As a result, the joule heating rate of the heating element drops significantly, enough so that the heating of the element slows. Since the ratio of maximum heating rate to minimum heating rate determines the range over which the heating element can adequately maintain constant temperature, this ratio and the corresponding ratio, $R_{max}/R_{min}$, are significant indications of the temperature self-regulation performance of the heating element.

The resistance of a heating element strip one unit wide, one unit long, and one skin depth thick is:

$$R_{surface} = \rho/\delta \quad (3)$$

Substituting for $\delta$ from Equation 2:

$$R_{surface} = (\omega\mu\rho/2)^{1/2} \quad (4)$$

$R_{surface}$ is called the surface resistivity and may be considered as the effective AC resistivity of a material. Since achieving the most rigid temperature self-regulation requires achieving the highest ratio of $R_{max}/R_{min}$, we find from using Equation 4 that this means achieving the highest ratio of:

$$\frac{R_{MAX}}{R_{MIN}} = \sqrt{\frac{\mu_{r,T<Tc}}{\mu_{r,T>Tc}} \frac{\rho_{T<Tc}}{\rho_{T>Tc}}} \quad (5)$$

Unfortunately, commercially available magnetic induction cooking devices do not employ circuitry to maintain induced current within a load at nearly constant levels as the load's magnetic permeability drops precipitously, a premise upon which the prior art heating elements described above depend. The term constant current refers to the following relationship:

$$\frac{\Delta I}{I} = -1/2 \frac{\Delta R}{R} \quad (6)$$

Fortunately, commercially available magnetic induction cooking devices do employ circuitry designed to prohibit excessively high currents from flowing through the inverter circuit, and hence through the load. This type of circuitry, typically called a "no load" or "abnormal load" condition detector, is designed to employ a feedback parameter that depends directly upon the impedance of the load. This feedback parameter, whose detection and use do not require thermal contact with the load, and the no load detection circuitry are used to interrupt a sustained current through the induction heating coil, thus interrupting the magnetic field and protecting the inverter from the abnormal load condition, when no load or a relatively low load situation is encountered. U.S. Pat. Nos. 3,978,307 to Amagami et al., and 4,115,676 to Higuchi et al., incorporated by reference, disclose no load circuitry. Prior art servingware, however, are not provided with heating elements configured for using the no load detection circuitry to achieve temperature self-regulation.

SUMMARY OF THE INVENTION

The heat retentive, temperature self-regulating, food retaining apparatus of the present invention addresses the prior art problems discussed above. More particularly, the food retaining apparatus includes an improved heat retentive core, and a heating element configured for regulating the temperature of the core using no load detection circuitry of conventional magnetic induction heaters.

In broad terms, the food retaining apparatus includes a food retaining means, a heat retentive core operably coupled with the food retaining means, and a magnetic induction heating element. The core is provided for transferring heat to the food retaining means. The heating element is in thermal contact with the core for heating the core.

The food retaining means includes a substantially rigid, heatable, food-contacting wall defining a cavity. The core is positioned in the cavity and includes a matrix of a phase change material and a resilient material. The phase change material stores latent heat during a phase transformation occurring at a phase transformation temperature. The resilient material permits expansion of the phase change material within the matrix during the phase transformation. The food contacting wall and core cooperably provide a heat retentive apparatus.

The phase change material is preferably a solid state phase change material that undergoes a solid-to-solid phase change at a phase transformation temperature. Exemplary phase change materials include pentaerythritol ($C_5H_{12}O_4$), pentaglycerine ($C_5H_{12}O_3$), also called trimethylolethane, neopentyl glycol ($C_5H_{12}O_2$), neopentyl alcohol ($C_5H_{12}O$), and neopentane ($C_5H_{12}$). These materials reversibly store large amounts of latent heat per unit mass, each at a unique constant transformation temperature well below their respective melting points. Furthermore, these transformation temperatures may be adjusted over a wide range of temperatures from 25° C. to 188° C. by selecting and mixing different of solid-state phase change materials. See Murrill et al., "Solid-Solid Phase Transitions Determined by Scanning Calorimetry", *Thermochim. Acta.*, 1 (1970) pp.239–246 and 409–414, and in *Thermochim. Acta.*, 3 (1972) pp. 311–315; Chandra et al., "Adjustment of solid-solid Phase Transition Temperature of Polyalcohols by the Use of Dopants", *Advances in X-Ray Analysis*, 29 (1986) pp. 305–313; and Font et al., "Calorimetric Study of the Mixtures PE/NPG and PG/NPG", *Solar Energy Materials* 15 (1987) pp. 299–310.

Although solid-state phase change materials are paramagnetic and cannot be directly heated by magnetic induction, they may be so heated by placing the materials in thermal contact with a ferromagnetic heating element. Therefore, the preferred heat retentive core of the servingware of this invention, comprises an appropriate heat retentive material in thermal contact with some form of ferromagnetic heating element, yielding an improved heat retentive server which can be heated by magnetic induction. The solid-state phase change material should not be in direct physical contact with a metal so as to prevent the degradation of the heat storage capacity of the polyol crystals after a limited number of cycles.

The heating element accordingly includes ferromagnetic material responsive to a magnetic field for inducing an electric current in the element for joule heating of the element. The ferromagnetic material has a Curie temperature between the phase transformation temperature and melting temperature of the phase change material. As a result, the element is configured to heat the core to a temperature above the phase transformation temperature of the phase change material. Once above this temperature, the phase change material is able to release the stored energy to keep the food-contacting wall of the food retaining means warm for extended periods.

Magnetic induction as a heating method has several advantages over microwave heating. For example, since the radiation frequency range is so much lower, radiation hazards are much less. This allows more design flexibility in designing heating devices that heat large numbers of heat retentive servingware containing a solid-state heat storage material in a short amount of time. Another advantage is that ferromagnetic materials have been shown to be efficient heat generators upon exposure to alternating magnetic fields in the same frequency range (from 20 kHz to 50 kHz) as that currently being used in commercially available magnetic induction cooking devices. As a result, the electronics necessary for magnetic induction heating of ferromagnetic heating elements is relatively inexpensive and readily available.

Another advantage of employing magnetic induction as a heating method for an improved heat retentive server is that temperature self-regulation of the server itself is possible. For example, the ferromagnetic material is preferably designed to self-regulate indefinitely about a temperature just above the phase change temperature of the solid-state phase change material but well below the melting temperature thereof. Temperature self-regulation permits a device to be heated with magnetic induction for an indefinite period of time without fear of thermal runaway. Such a safety feature allows flexibility in the use of magnetic induction heating devices for the servers and related servingware. Temperature self-regulation also permits the device to double as a temperature holding device and heat retentive server. Restaurants, for instance, may place the heat retentive servingware upon a magnetic induction cook top or other magnetic induction device to hold food retained by the servingware at a relatively constant temperature for an indefinite period prior to serving it to customers. Once served, the heat retentive material keeps the food warm throughout the meal.

The present inventive food retaining apparatus may also be used with an improved magnetic induction heater for heating several servingware pieces at once. For example, a stack of such food retaining apparatus acts as an electromagnetic core consisting of ferrimagnetic material, increasing the magnetic flux of the magnetic field applied. The magnetic flux within the core increases as a multiple proportion to the relative permeability of the core material. Furthermore, the resultant magnetic field is focused within and throughout the extent of the core. This principle can also be applied to improve the performance of this invention. By homogeneously mixing a soft ferrite powder into the polyol mixture of the heat retentive core of this invention, a stack of food retaining apparatus emulates a ferrite core. As a result, the magnetic field created by an induction coil may be focused through several apparatus in a stack, providing heat generation in more than one apparatus at a time.

DESCRIPTION OF THE DRAWING FIGURES

FIG. 1 is a cross-sectional view of a heat retentive food retaining apparatus having a temperature self-regulating core constructed in accordance with a preferred embodiment of the present invention.

FIG. 2 is a plan view of a heating element of the apparatus of FIG. 1.

FIG. 3 is a cross-sectional view of a member of the heating element of FIG. 2.

FIG. 4 is an alternative embodiment of the apparatus of the present invention.

FIG. 5 is an alternative embodiment of the heating element of the apparatus of FIG. 1.

FIG. 6 is a schematic illustration of a temperature self-regulating, food warming device of the present invention.

FIG. 7 is an elevational view in partial section of coffee carafe constructed in accordance with an alternative embodiment of the present invention.

FIG. 8 is a plan view of a heating element constructed in accordance with an alternative embodiment of the present invention.

FIG. 12 is a sectional view of a heat retentive pellet.

FIG. 13 is a sectional view of a pot constructed in accordance with an alternative embodiment of the present invention.

FIG. 16 is a graph illustrating variations in the ferromagnetic Curie temperature $T_c$ of Ni—Cu alloys of varying compositions.

DETAILED DESCRIPTION OF THE PREFERRED EMBODIMENTS

Figure 6A:
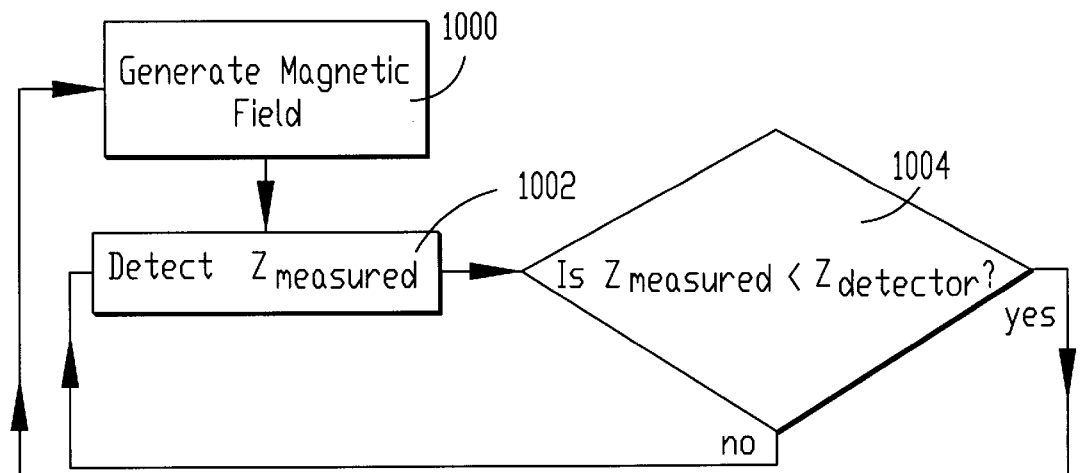
FIG. 6A is a flow diagram of a conventional no load detection circuit.

A heat retentive, temperature self-regulating food retaining apparatus 10 constructed in accordance with a preferred embodiment of the present invention is illustrated in FIG. 1. The food retaining apparatus 10 broadly includes a body 12, a heat retentive core 14, and a magnetic induction heating element 16 imbedded in the core 14.

The body 12 is provided as a food retaining means and includes a generally rigid, food-contacting wall 18, and an annular rim portion 20. The wall 18 includes a downwardly extending wall portion 22 and defines a cavity 24 configured for receiving the core 14. The body 12 is constructed from a vitrified ceramic material that has been glazed. Of course, glass, plastic materials, or any other suitable material may also be used. The body 12 possesses a heat resistance of at least 100° C. (212° F.) and is essentially transparent to electromagnetic energy in both the RF and microwave frequency ranges.

In the illustrated preferred form, the food retaining apparatus 10 is shaped similar to a conventional plate, and is compatible with commercially available insulated domes. Therefore, the body 12 is generally circular with an outside diameter matching the inside diameter of the dome to be used. Such domes typically have an inside diameter of between about 7¾"–9". The wall 18 may present a decorative style or design.

It should be noted that any manner of servingware body may be substituted for the above described body 12 so long as the servingware body comprises an open cavity for receiving the heat storage composition of this invention. Any shape or type of heat retentive servingware will still retain all the advantages of this invention. Other contemplated types of heat retentive servingware include bowls, platters, cups, bread plates, all manner of specialized serving dishes, beverage containers, etc.

The heat retentive core 14 is comprised of a heat storage composition matrix of solid state phase change material, ferrite material, a fire retardant additive, and a flexible epoxy binder. The heating element 16 is imbedded in the core 14 for selective heating of the core 14.

The solid state phase change material is advantageously selected from the group consisting of polyhydroxy compounds (e.g., polyhydric alcohols (polyols) and glycols), and the $C_2$–$C_4$ polyalkylenes. Exemplary polyhydroxy compounds include trimethylol ethane, also known as pentaglycerine, pentaerythritol, neopentyl glycol, trimethylol propane, monoaminopentaerythritol, diaminopentaerythritol, tris (hydroxymethyl) acetic acid, cross-linked, high density polyethylene (HDPE) or a mixture of such compounds. The $C_2$–$C_4$ polyalkylene is preferably a cross-linked high density polyethylene.

Solid state phase change material provides sensible heat storage as well as reversible latent heat storage through solid-to-solid, crystalline phase transformations. Phase change material stores vast amounts of latent thermal energy about a single phase transition temperature. The latent thermal energy is emitted in a narrow temperature band centered about a temperature slightly lower than the transition temperature. Table 1 is taken from "Solid State Phase Transitions in Pentaerythritol and Related Polyhydric Alcohols", Solar Energy Materials, 13 (1986) p. 134, by Benson et al., and shows the thermal properties for some of the above-mentioned polyols.

TABLE 1

| Name | Formula | Molecular Weight | Latent Heat of Melting (kJ/kg) | Melting Temperature (° C.) | Latent Heat of Transition (kJ/kg) | Transition Temperature (° C.) |
|---|---|---|---|---|---|---|
| Pentaerythritol [2,2-Bis (hydroxymethyl)-1,3 propanediol] | $C_5H_{12}O_4$ | 136.15 | 36.8 | 258–260 | 303 | 184–185 |
| Trimethylol ethane (2-hydroxy-methyl-2-methyl-1,3-propanediol | $C_5H_{12}O_3$ | 120.15 | 44.6 | 197–198 | 193 | 81 |
| Neopentyl glycol (2,2-dimethyl-1,3 propanediol) | $C_5H_{12}O_2$ | 104.15 | 45.3 | 125–126 | 131 | 40–43 |

The amount of latent thermal energy stored by neopentyl glycol and trimethylol ethane is comparable to the energy stored by the finest available waxes currently being used in commercially available heat retentive servers, approximately 160 kJ/kg. The amount of latent thermal energy stored by pentaerythritol is significantly higher. However, solid state phase change materials have other more significant advantages over conventional waxes. One advantage is that the crystalline phase transition temperature of the solid state phase change materials of the invention can be adjusted over the temperature range of between about 7–200° C. (45–392° F.) by selecting certain of the above-mentioned phase change materials, alone or in suitable mixtures, depending upon the specific phase transition temperature desired. Examples of suitable mixtures and their resultant phase transition temperatures can be found in Advances in X-Ray Analysis, Vol 29, 1986, pp. 305–313, entitled "Adjustment of Solid-Solid Phase Transition Temperature of Polyalcohols by the Use of Dopants", by D. Chandra et al., which is incorporated by reference herein.

Another advantage of the solid state phase change materials over waxes is that the latent heat is stored in a solid-to-solid rather than a solid-to-liquid transition. This advantage is a multiple one. First, containment becomes less critical and therefore easier. Since during normal use no molten material will exist within the servingware, leakage of dangerously hot fluids is avoided. Furthermore, because the thermal expansion during a crystalline solid-to-solid phase transition is minimal compared to the expansion undergone by a wax during a solid-to-liquid transition, less room for expansion is required and simpler containment designs may be employed. Finally, permanently increasing the thermal conductivity of a solid-to-solid phase change material such as a polyol is much easier than doing so for a solid-to-liquid phase change material. Particulate additions once homogeneously dispersed, will stay homogeneously dispersed in a phase change material throughout solid-to-solid phase transformations. In a solid-to-liquid transformation, particulate additions tend to settle in a phase change material under the influence of gravity.

Trimethylol ethane is the preferred polyol for use in the heat retentive servingware of this invention. The phase transformation temperature of trimethylol ethane of approximately 81° C. (178° F.) is ideal for storage of latent heat in commercially available oven-type heated base dispensers. This material releases its stored latent heat at a temperature less than 81° C. (178° F.) but well above that required to maintain food at temperatures above 60° C. (140° F.) for extended periods of time. Furthermore, trimethylol ethane is extremely low in toxicity, has been approved for food contact use by the FDA, and is readily available at relatively low cost.

The addition of ferrite powder to the heat retentive core serves two main purposes. First, the ferrite powder increases the magnetic flux density within the heat retentive core for a given magnetic field strength produced by an induction coil. Second, the powder increases the thermal conductivity of the heat retentive core, allowing heat to be transferred throughout the heat storage polyol material more quickly.

The ferrite powder increases the magnetic flux density of the food retaining apparatus 10 so that the apparatus 10 is heated more quickly and more efficiently by a magnetic induction heating coil. The ferrite can permit several adjacent or stacked plates to be heated simultaneously by a single induction coil. Furthermore, the ferrite also increases the generally low thermal conductivity of the polyol material. Ferrites, being ceramic materials in a fully oxidized state, should not degrade the heat storage capacity of the polyol crystals. No known prior art has taught the addition of ferrites to polyols so as to allow them to improve their thermal conductivity while at the same time allow more efficient heating by magnetic induction.

The ferrite powder preferably has a high initial permeability, high microwave (particularly 2450 MHz) lossiness, and low lossiness for the RF magnetic induction frequency used to heat the servingware. Many commercially available ferrites which have been used for years as core materials for transformers and other electrical equipment fit this profile. Such commercial uses require high magnification of the magnetic flux density while having little energy loss at low frequencies due to eddy current production. It is known that ferrites can possess any range of properties by compounding them with zinc, manganese, cobalt, nickel, lithium, iron, or copper as disclosed in two publications: *Ferrites,* by J. Smit and H. P. J. Wijn, John Wiley and Sons, New York, 1959, page 1, etc. and *Ferrites: A Review of Materials and Applications,* by F. E. Riches, Mills and Boon Limited, London 1972, page 9, etc. Therefore, selection of the proper ferrite powder to provide high initial permeability, low RF losses, high microwave frequency losses, and relatively high thermal conductivity will be apparent to one skilled in the art. For each different type of servingware of this invention, a unique ferrite or combination of ferrites may be appropriate. Various manganese zinc, nickel zinc, and copper zinc ferrites with acceptable properties are available from Steward, Inc., of Tennessee. A manganese zinc ferrite, designated Steward moment 35, has shown adequate performance in tests.

The fire retardant additive is preferably selected from the group consisting of alpha-alumina trihydrate, the phosphate esters, chlorinated hydrocarbons, bromated hydrocarbons, antimony trioxide, borates, polyols containing phosphorous, and brominated bisphenol A. The additive is added to the polyol/ferrite powder mixture prior to mixing with flexible epoxy binder during core manufacture.

Alpha-alumina trihydrate is the most preferred fire retardant additive. When alpha-alumina trihydrate is exposed to fire, the hydrate decomposes endothermically, releasing most of its chemically bound water, and acts as a heat sink to absorb the heat of the fire. Several properties of alpha-alumina trihydrate are advantageous for use in this invention. Being a ceramic, it can be obtained in powder form with average particle size below 10 microns. Micron sized particles allow for homogeneous mixing with the polyol and ferrite in powder form. Alpha-alumina trihydrate is also readily available, relatively inexpensive, safe to handle, an has a "generally recognized as safe" (GRAS) rating from the FDA. Finely ground alpha-alumina trihydrate, for example, is used as a constituent in toothpaste.

The flexible epoxy binder serves as a binder for the heat retentive composition, an encapsulant for the solid state phase change material, an adhesive to maintain thermal contact between the heat retentive core 14 and the body 12, a thermal expansion equalizer (permitting expansion of the solid state phase change material within the composition matrix during phase transformation) and a slow energy release from the polyol to the body 12. Furthermore, the flexible epoxy binder is capable of maintaining its properties at continuous operating temperatures of up to 177° C. (350° F.) and peak temperatures of 204° C. (400° F.).

As a binder, the flexible epoxy maintains the thermal contact between the ferrite and the polyol. As an encapsulant, the flexible epoxy coats each particle of the solid state phase change material, acting to keep such particles from contacting the heating element 16. Such contact would eventually degrade the heat storage performance of the polyol. The binder acts as a safety encapsulant should gross overheating of the heat retentive apparatus 10 result in the solid state phase change material becoming partially or fully molten. As an adhesive and thermal expansion equalizer, the binder ensures a long lasting bond between the core 14 and the body 12 by permitting expansion of the phase change material during a phase transformation of between about 5–15% of the volume of the phase change material prior to the transformation. As an insulator, the binder ensures a slow, steady conduction of heat from the encapsulated polyol to the food-contacting wall 18 and the food contacting the wall 18.

The preferred flexible epoxy binder is a mixture of three resins and two curing agents. The resins include bisphenol A resin, such as Dow D.E.R. 383 resin, novolak epoxy resin, such as Dow D.E.N. 431 resin, and a flexible epoxy resin additive, such as an aliphatic diepoxide. Dow D.E.R. 732 resin is a suitable aliphatic diepoxide. The curing agent includes cycloaliphatic amine, such as Ancamine 1770 available from Air Products and Chemicals, Inc., and N-(2-hydroxy ethyl) diethylene triamine, such as Ancamine T also available from Air Products and Chemicals, Inc. Many blend ratios of these three resins and two curing agent may be employed for the products of this invention, depending upon the regulation temperature desired.

One preferred resin mixture for low temperature application includes 56% by weight bisphenol A resin, 14% by weight novolak epoxy resin, and 30% by weight flexible epoxy resin additive. The flexible epoxy resin additive may be lowered to 25% or raised to 40% by weight while keeping the ratio of bisphenol A to novolak epoxy resin the same. The optimum parts per weight of curing agent per hundred parts of this epoxy resin mixture is about 11 phr Ancamine T and 5 phr Ancamine 1770.

Another preferred resin mixture for higher temperature applications includes 70% by weight novolak epoxy resin, 10% by weight bisphenol A epoxy resin, and 20% by weight flexible epoxy resin additive. The flexible epoxy resin additive may be lowered to 10% or raised to 30% while keeping the ratio of novolak epoxy resin to bisphenol A the same. The optimum parts per weight of curing agent per hundred parts of this epoxy resin mixture is about 12 phr Ancamine T and 5 phr Ancamine 1700.

The heating element 16 of this invention has several preferred features. The element 16 is self-regulative at a temperature that is above the phase change temperature, but below the melting temperature of the solid-state phase change material in the core 14. The element 16 is also self-regulative when heated by commercially available magnetic induction cooking devices that do not employ circuitry to maintain induced current within the heating element 16 at nearly constant levels. The element 16 transfers heat uniformly to substantially the entire core 14. In addition, the element 16 should take up a minimal space within the core 14.

The heating element 16 of the present invention is temperature self-regulating when heated by commercially available magnetic induction cooking devices that do not employ circuitry to maintain induced current within the heating element at nearly constant levels. As noted above, such prior art cooking devices typically employ circuitry designed to prohibit excessively high currents from flowing through the inverter circuit, and hence through the load.

The heating element 16 of the present invention is designed to have an impedance when heated above the Curie temperature, whose magnitude, $Z_{min}$, is below that which triggers the no load detection circuitry of a commercially available magnetic induction cooking device to interrupt its magnetic field generation. For the discussion below, the magnitude of load impedance that triggers the no load detection circuitry shall be referred to as $Z_{detector}$[1]. The heating element 16 also has an impedance when at a temperature less than the Curie temperature whose magnitude, $Z_{max}$, is significantly greater than $Z_{detector}$ so as to achieve a significant heating rate.

[1] In actuality, the impedance of the external load (heating element 16) may not be "detected" or "sensed" directly, but the influence of the impedance upon the performance of the circuit is reflected in a parameter that is directly "sensed". The exact parameter "sensed" by the various commercial "no-load" detection systems referred to in this disclosure to interrupt the current flow in the inverter circuitry that produces the alternating magnetic field may differ (some sense the amount of current flowing through the induction coil, some sense the voltage drop across a particular resistor in the detection circuit, some detect a variation in oscillation frequency, still others another parameter). However, each commercially available "no-load" detection system ultimately reacts to a threshold value of load impedance, which we will hereinafter call $Z_{detector}$, below which the current through the induction coil is de-energized. Therefore, all discussion of interaction between the heating elements of this invention and commercially available magnetic induction heating devices employing "no-load" detection circuitry will deal with an "impedance detection means" and this threshold load impedance.

Because the heating element 16 does not change its geometry (slight metal expansions can be ignored) during transitions through the Curie temperature, any changes in the impedance, Z, of the element 16 are proportional to changes in the resistance, R, of the element 16. Therefore, according to Equation 4, the impedance, Z, of the element 16 is proportional to the equation $(\omega\mu\rho/2)^{1/2}$. Assuming that the angular frequency, $\omega$, of the element 16 remains relatively constant as the element 16 transitions through the Curie temperature, the maximum impedance, $Z_{max}$, of the heating element occurs just prior to the Curie temperature, and obeys the following proportionality relationship:

$$Z_{max} \; \alpha(\mu_{r,T<Tc} * \rho_{T<Tc}) \qquad (7)$$

Similarly, the minimum impedance, $Z_{min}$, of the heating element occurs just after the Curie temperature, and obeys the following proportionality relationship:

$$Z_{min} \; \alpha(\mu_{r,T>Tc} * \rho_{T>Tc}) \qquad (8)$$

Because the value of $Z_{detector}$ may vary slightly from one commercially available magnetic induction cooking device to another, the heating element 16 is constructed from materials to allow a relatively large difference between $Z_{min}$ and $Z_{max}$. This allows $Z_{min}$ to be designed below $Z_{detector}$ while allowing $Z_{max}$ to be high enough to achieve acceptable heating rates and efficiencies for virtually all commercially available cooking devices.

In summary, the principle of the temperature self-regulating heating element 16 is that at a regulation temperature very near its Curie temperature, the impedance of the element 16 drops to a level so that the no-load detection system circuitry of a commercially available cooking device de-energizes the current flowing through the induction heating coil, thereby eliminating magnetic field production and thus interrupting the joule heating of the element 16. As soon as the temperature of the heating element 16 drops below the regulation temperature, the impedance of the element 16 increases to a level well above that required for the "no-load" detection system circuitry to re-energize the switching elements of the inverter, thereby re-emitting the changing magnetic field. As a result, joule heating is re-established. Because this heating/cooling cycle is reversible, the heating element self-regulates about the regulation temperature.

Referring now to FIG. 6A, a flow diagram is illustrated that corresponds to the actions of the conventional no load detection circuitry. At reference numeral 1000, a magnetic field is generated. Thereafter, the impedance of the element 16, $Z_{measured}$, is detected at numeral 1002. $Z_{measured}$ is then compared with $Z_{detector}$, numeral 1004, and if $Z_{measured}$ is less than $Z_{detector}$, representative of the temperature of the element 16 being greater than the Curie temperature, the magnetic field is interrupted, numeral 1006. After the magnetic field is interrupted, the field is periodically regenerated so that the impedance of the element 16 may again be detected. The field will be interrupted again if $Z_{measured}$ remains below $Z_{detector}$. When $Z_{measured}$ rises above $Z_{detector}$, representative of a drop in the temperature of the element below the Curie temperature, the magnetic field will remain generated. This series of detector and comparison is continuously repeated while the cooking device is used.

Experimentation has shown that the temperature at which the heating element 16 self-regulates may be adjusted by altering the distance between the heating element 16 and the source of the magnetic field. The effective load impedance that the heating element 16 presents to the magnetic induction circuitry is dependent upon the distance between the heating element 16 and the induction heating coil. As a result, $Z_{max}$, and thus the difference between $Z_{max}$ and $Z_{detector}$, is inversely proportional to the distance between the element 16 and the magnetic field source. Because the impedance of the element 16 drops to $Z_{min}$ over a given, finite temperature range, the temperature at which the impedance of the element 16 drops below $Z_{detector}$ may be adjusted throughout the range by adjusting the distance between the element 16 and the magnetic field source.

Figure 6B:
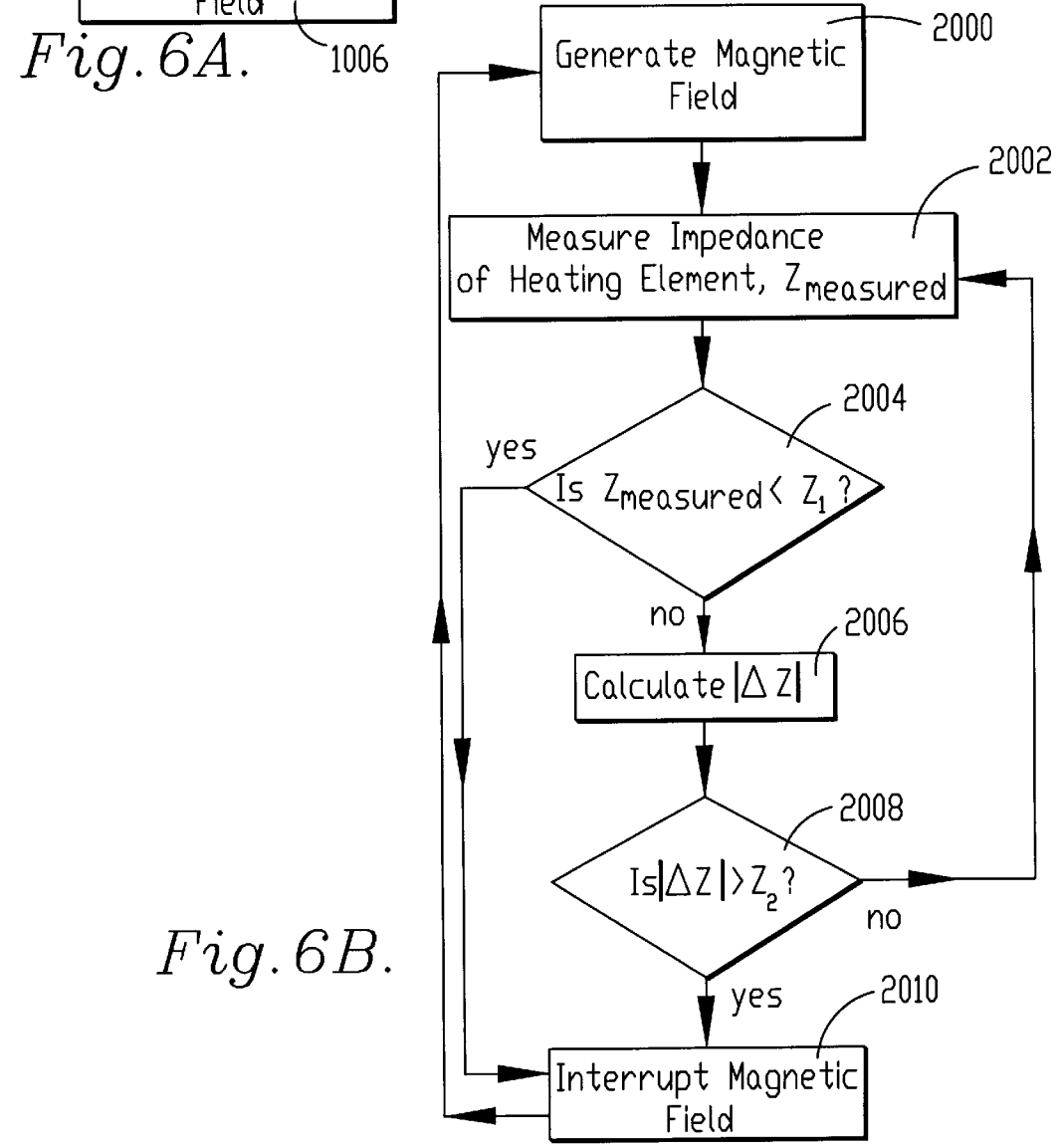
FIG. 6B is a flow diagram of an alternative no load detection circuit.

An alternative method of detecting the impedance of the heating element 16, $Z_{measured}$, and determining when to interrupt the magnetic field is illustrated in FIG. 6B. The alternative method is configured to eliminate the dependence of the temperature of self-regulation on the distance between the heating element 16 and the magnetic source. In this alternative method, two comparisons are made in determining whether to interrupt the magnetic field. The first comparisons, numeral 2004, is similar to the comparison shown in the method of FIG. 6A, the measured impedance, $Z_{measured}$, is compared with a predetermined impedance level, $Z_1$. If $Z_{measured}$ is less than $Z_1$, the circuitry will interrupt the magnetic field and will cause periodic measurements of the impedance of the heating element 16 to be made. As long as $Z_{measured}$ is greater than $Z_1$, a second comparison is made.

The second comparison, reference numeral 2008, is based on the absolute value of the change in the impedance, $|\Delta Z|$, between the current and immediate past measured impedances, $Z_{measured}$ and $Z_{past}$, respectively. It is noted that during the first round of measurements, no value will have been assigned to $Z_{past}$, therefore, the magnetic field will always be interrupted after the initial measurement and comparison. After the second measurement of the impedance of element 16, the field will be interrupted if $|\Delta Z|$ is greater than a second preselected impedance value, $Z_2$. As long as $|\Delta Z|$ remains less than $Z_2$, the impedance of the heating element 16 will be remeasured, as shown in the flow diagram, FIG. 6B.

The second comparison effectively eliminates the dependence of the self-regulation temperature on the distance between the heating element 16 and the magnetic induction heating coil because the absolute value of the rate of change of the impedance of heating element 16 between $Z_{max}$ and $Z_{min}$, $|dZ/dt|$, is not linear. Tests show that $|dz/dt|$ increases as the temperature of the heating element increases toward the temperature corresponding to $Z_{min}$. Therefore, by selecting a particular value of $|\Delta Z|$, namely $Z_2$, over the specific interval of time during which the second comparison is made, a particular temperature (within a small temperature range), corresponding to that value of $|dZ/dt|$ becomes the self-regulation temperature, regardless of that temperature's corresponding value of $Z_{measured}$. The reason that the first comparison is still needed is that the second comparison alone would not interrupt the magnetic field (after two measurements) if either no load or a heating element already well above its Curie temperature were placed upon the magnetic induction cooking device.

Various materials may be used to construct the heating element 16 to achieve the preferred characteristics. For example, the element 16 may be constructed from a single pure ferromagnetic metal or single ferromagnetic alloy having a relative magnetic permeability which drops significantly at temperatures above the Curie temperature. The ratio of $\rho_{T<Tc}/\rho_{T>Tc}$ is sufficiently close to 1, therefore, the difference between $Z_{max}$ and $Z_{min}$ depends upon the difference between $\mu_{r,T<Tc}$ and $\mu_{r,T>Tc}$. Because $\mu_{r,T<Tc}$ has values which fall in the range from 100 to 1000 for most ferromagnetic metals, and $\mu_{r,T>Tc}$ is approximately equal to one, the difference is significant.

The ferromagnetic material is preferably composed of an alloy of nickel with either aluminum, zinc, or copper. As is shown in FIG. 16, taken from "Magnetic Properties of Metals—d-elements, alloys, and compounds", editor H. P. J. Wijn, Springer-Verlag, Berlin, 1991, nickel alloyed with copper shows a linear relationship between the ferromagnetic Curie temperature and the composition percentages. This linear relationship and the miscibility of nickel and copper in each other make an alloy of nickel and copper attractive for use as the material of the heating element 16. By choosing the percentages of both nickel and copper, it is possible to select the appropriate Curie temperature for various types of heat retentive servingware.

Referring to Equations 7 and 8, a greater difference between $Z_{max}$ and $Z_{min}$ can be achieved when both the electrical resistivity, $\rho$, and the relative magnetic permeability, $\mu_r$, of the heating element are made to drop dramatically just after the Curie temperature. The characteristics are yielded when the heating element 16 is constructed from a substrate 26 of non-magnetic material and a layer 28 surrounding the substrate 26 of ferromagnetic material, illustrated in FIG. 3. The non-magnetic material has high thermal and electrical conductivity, while the ferromagnetic material has low electrical conductivity. As the induced current spreads into the body of the heating element at temperatures above the Curie temperature of the ferromagnetic material, the cross-sectional area of the current flow path is increased, and current path spreads into the more highly conductive material of the core. Therefore, the impedance of the heating element at temperatures above the Curie temperature, $Z_{min}$, becomes less due to both a drop in relative magnetic permeability and a drop in electrical resistivity.

Of course, it is also necessary to maintain the value of $Z_{max}$ high enough to achieve the desirable large difference between $Z_{max}$ and $Z_{min}$ noted above. Providing a layer of ferromagnetic cladding approximately 1.5 to 1.8 skin depths in thickness, $Z_{max}$ remains essentially that of a heating element constructed solely from the same ferromagnetic material. Therefore, a relatively large difference between $Z_{max}$ and $Z_{min}$ is achieved. This greater difference not only allows $Z_{min}$ to be designed below $Z_{detector}$ for virtually all commercially available cooking devices, but allows $Z_{max}$ to be even further above $Z_{detector}$, thereby achieving higher heating rates and efficiencies than with a single metal heating element.

For the heat retentive servingware of this invention, a heating element with a copper or aluminum core and a cladding of a nickel-copper alloy is particularly practical. One method to achieve the desired alloy cladding is via electrodeposition. The exact percentages of nickel and copper of the desired alloy cladding are achieved in an electroplating process of the copper or aluminum core. Electrodeposition of alloys is discussed in detail in *Electrodeposition of Alloys: Principles and Practice,* Volume 1 of 2, by Abner Brennar, Academic Press, New York, 1963, pp. 1 et seq., incorporated by reference.

The ratio of nickel to copper in the alloy cladding is adjusted primarily by changing the ratio of nickel to copper in the electroplating bath. The thickness of the nickel-copper plating is manipulated by adjusting the electroplating time.

The preferred element 16 of food retaining apparatus 10 includes a substrate 26 constructed from aluminum, and a layer 28 surrounding the substrate 26 of a ferromagnetic alloy, as illustrated in FIG. 3. The alloy is composed of approximately 78 percent nickel and 22 percent copper, yielding a Curie temperature of approximately 100° C. (212° F.), a temperature above the phase change temperature of trimethylol ethane, 81° C., but well below its melting temperature of 197° C. The electrodeposition of the cladded layer 28 has an advantage in that only selected complete circuit paths of the inductive heating element may be clad, reducing the cost of the heating element.

The relatively thinner layer 28 may also be bonded to the relatively thicker sheet of copper or aluminum substrate. The thin sheet of the desired nickel-copper alloy may be produced by melting the constituent metals together and then forming the sheet as has been described in this disclosure. Several electro-conducting and thermally conducting, temperature resistant bonding methods or agents capable of withstanding the different thermal expansion rates of the substrate and cladding are known in the prior art.

In an alternative form, food retaining apparatus 10 includes an element 16 constructed solely from an alloy of approximately 78 percent nickel and 22 percent copper. The Curie temperature of the alloy is approximately 100° C. (212° F.), a temperature above the phase change temperature of the preferred phase change material, trimethylol ethane, 81° C. (178° F.), but well below the melting temperature of 197° C. (387° F.) of the phase change material. Including copper improves the thermal conductivity of nickel, thus effecting more efficient transfer of heat throughout the heating element and throughout the heat retentive core.

The proper proportions of the pure metals are melted together to form ingots of the alloy. These ingots are then converted into strip or sheet form from which the heating elements may be fabricated, as discussed in more detail below. The advantage of the single metal approach is the ease of fabrication after the ingots have been produced. A disadvantage of this approach is the higher cost and bulkiness of the element constructed from such an alloy. For example, in order to get the full benefit of the difference between $Z_{max}$ and $Z_{min}$ from a strip of homogeneous nickel/copper alloy, it should be at least one skin depth thick in each temperature range, that is, at temperatures both below and above its Curie temperature. At temperatures below its Curie temperature, the skin depth $\delta$ of a nickel/copper alloy of high percentage nickel, assuming $\mu_r=100$, and $\rho=8\times10^{-8}$ ohm-m, at a frequency of 20 kHz, typically the lower end of frequencies used by most commercial magnetic induction cooking devices, is approximately 0.004 inches. However, at temperatures above the Curie temperature of the alloy, the skin depth increases to approximately 0.038 inches under the same conditions. This latter value of skin depth necessitates a relatively bulky heating element. The material costs of the heating element, of course, increase with bulk.

For some items of servingware of this invention where added bulk and cost can be tolerated, a heating element made from a single pure ferromagnetic metal will be economically and mechanically feasible. However, for most items of servingware, the material used to make the heating element preferably consists of a core of non-magnetic material with high thermal and electrical conductivity clad with a thin surface layer of a ferromagnetic material of low electrical conductivity.

The cladding designs described above offer the advantages of reduced cost and bulkiness relative to the heating element constructed entirely from a single ferromagnetic alloy. For example, only a relatively thin surface layer of the nickel-copper alloy need be plated or adhered (approximately 1.5 to 1.8 skin depths) on the much thicker copper or aluminum substrate (approximately 1 skin depth). For a nickel/copper alloy of high percentage nickel electroplated onto a strip of pure copper, the skin depth $\delta$ of a nickel/copper alloy of high percentage nickel (assuming $\mu_r=100$, and $\rho=8\times10^{-8}$ ohm-m) at a frequency of 20 kHz (typically the lower end of frequencies used by most commercial magnetic induction cooking devices) is approximately 0.004 inches, while the skin depth $\delta$ of the pure copper at the same frequency is approximately 0.019 inches. Therefore, an alloy clad heating element strip approximately 0.025 inches thick could outperform a single alloy heating element strip approximately 0.038 inches thick. Furthermore, because the cost of pure copper or aluminum is less than that of a high nickel percentage nickel-copper alloy, the alloy clad heating element material also has a materials price advantage over its single metal counterpart.

Referring now to FIG. 2, the heating element 16 constructed in accordance with a preferred form is illustrated. The form of element 16 permits element 16 to conduct heat to the core 14 evenly. The preferred form of element 16 is that of an expanded metal sheet die cut into the shape required to substantially fill the cavity 24 of body 12. Expanded metal sheet begins as ordinary metal sheeting or strip. It is simultaneously slit and stretched by shaped tools which determine the pattern and number of openings. Strand dimensions, width and thickness, overall thickness of the expanded metal sheet, and weight per square inch are controlled variables. The Exmet Corporation of Naugatuck, Conn., produces expanded metal to virtually any specification. One square foot of ordinary metal sheeting results in two to three square feet of expanded metal sheet. An overall thickness of over 0.100 inch may result from an ordinary metal sheet thickness of 0.005 inch. This ability to create large overall thicknesses from very thin metal sheet allows the heating element 16 to transfer its heat uniformly to the core 14 while taking up minimal volume of the core 14.

The size, shape, and number of openings per square inch of the element 16 are important specifications. The heating element 16 has the shape of a circular disc. The diameter of the element 16 is slightly smaller than the inner diameter of the cavity of the body 12. The original sheet thickness of the metal of the element is approximately from 0.015 to 0.020 inches thick. The overall expanded thickness of heating element 16 is slightly less than overall thickness of the heat retentive core 14 itself.

Referring again to FIG. 1, the food retaining apparatus includes a core retaining cap 30. The cap 30 is provided to encapsulate the core 14 within the cavity 24, and presents a durable, waterproof, aesthetic surface for the bottom of the apparatus 10. The cap is constructed from a flexible synthetic resin configured for adhering to the body 12 and permitting slight expansions and contractions of the core to maintain integrity throughout consecutive heat/cool cycles. Of course, for a plastic body 12, the cap 30 may be constructed from the same plastic material as body 12 and then either adhered or welded to body 12.

The cap 30 is preferably constructed from the same flexible epoxy mixture described above for use in the core 14. A fire retardant selected from the group noted above, in fine powder form, may be dispensed with the epoxy mixture. A pigment of choice is added for aesthetic purposes. The preferred thickness of cap 30 is approximately 0.0625 inches. The cap 30 may alternatively be constructed from material that includes thermoset plastics, such as urea-formaldehyde or phenolic resins, or thermoplastic resins with comparable properties to the flexible epoxy mixture described in this disclosure.

Food retaining apparatus 10 is constructed in the following manner. The body 12 is provided and turned upside down so that the heating element 16 may be placed into the cavity 24 of body 12. The element 16 is positioned to rest on the generally flat surface of the cavity 24. Several drops of silicone adhesive, such as RTV 102, are then placed upon the heating element to adhere the element 16 to the body 12. After the adhesive has cured, the heating element is in proper position and the heat retentive composition is ready to be placed within the cavity 24 of body 12.

Next, the composition for forming the core is mixed. First, the preferred polyol, ferrite, and fire retardant, which are in a dry state, are blended together to yield a homogenous mixture. The approximate percentages by weight of the polyol, ferrite and fire retardant for optimum performance of the heat retentive dinner plate are as follows:

| | |
|---|---|
| Polyol | 67% |
| Ferrite Powder | 17% |
| Fire Retardant | 17% |

Alternatively, ferrite powder and/or fire retardant may be eliminated from the dry mixture, in which case its respective percentage by weight would be replaced by polyol. The total mass of the dry constituents of the heat retentive composition used in a piece of heat retentive servingware of this invention depends upon the size, geometry, and desired heat storage capacity of the servingware.

The flexible epoxy components are then thoroughly mixed, and added to the homogeneously mixed dry constituents under high shear. The proper ratio of flexible epoxy to dry constituents is such that all particles of the polyol may be thoroughly wetted by the epoxy, thus providing the desired encapsulation. It has been found that the optimum percentages by weight of dry and wet ingredients are approximately:

| | |
|---|---|
| dry ingredients | 67% |
| flexible epoxy resin | 33% |

The height of the mixture above the surface of the heating element 16 (away from the flat surface of the cavity 24) should be kept low so that joule heating from the heating element 16 during magnetic induction heating may more easily be transferred to all parts of the core 14 formed by the mixture. If the desired thickness of core 14 is significantly greater than the thickest available heating element 16, tests have shown that a layer or layers of copper or aluminum expanded metal mesh may be attached to the heating element 16 (on surface side of the cavity 24 next to the body 12) to provide excellent thermal conductivity while not prohibiting temperature self-regulation of the core 14.

After the mixture has been poured, the apparatus 10 is oven cured for approximately 1 hour at about 93° C. (200° F.) and approximately 1 hour at about 121° C. (250° F.). Oven curing the apparatus 10 permits the mixture to set and form the core 14.

The core retaining cap is then poured into place into the cavity 24 of the body 12 so that it covers the core 14. Care is taken to remove air from beneath the level surface of the cap 30. The thickness of the cap 30 that covers the surface of the heat retentive composition should be chosen so as to provide a durable cover for the bottom of the apparatus 10. The preferred thickness of this layer is approximately 0.0625 inches.

In use, the food retaining apparatus 10 is pre-heated either by being placed into a convection oven at approximately 121° C. (250° F.) for at least one hour, on a magnetic induction cook top for an indeterminate amount of time. Food is then placed upon the top surface of the server so as to keep the food warm for a substantially longer period of time than the prior art devices. An insulated cover placed over the food further prolongs the holding time.

Referring to FIG. 4, an alternative embodiment of food retaining apparatus 10 is illustrated. The alternative embodiment includes a sheet 32 of sponge rubber positioned beneath the core 14 and above the cap 30. The sheet 32 decreases the heat losses through the bottom of the apparatus 10.

The rubber sponge material is preferably a medium density closed cell silicone rubber sponge sheeting. Other sponge materials with high heat resistance and good flammability rating such as neoprene or nitrile may also be used. The sheeting is about 0.0625 inches thick. The die-cut rubber sponge 24 may be purchased from Lamatek, Inc. of New Jersey.

In assembly of the alternative embodiment of the apparatus 10, the sheet 32 is die cut into the shape of the core 14 and placed on the core 14 prior to curing of the core so that the sheet 32 adheres to the tacky mixture. Care is taken to prevent air pocket formation between the rubber sponge 24 and the mixture. The mixture is then oven cured, and the cap 30 is poured and cured.

Another embodiment of the food retaining apparatus 10 includes the heating element 34 illustrated in FIG. 5. The alternative element 34 is relatively thin compared with the preferred element 16, and is used in applications requiring a lower profile. The alternative element 34 may be constructed from a single, ferromagnetic alloy, or from a non-magnetic substrate having a ferromagnetic layer.

The alternative element 34 is in the shape of a single layer, annular, flat spiral coil with a center terminal end 36 ohmically connected to an outer terminal end 38 by a flat strip 40. The strip 40 is electrically isolated from all other points of the flat spiral coil. The isolation is accomplished by insulating the coil with a thin layer of temperature resistant paint, enamel, epoxy or other suitable material. Preferably, an adhesive is used for insulating the strip 40 and coupling the strip 40 with the coil, such as a ceramic adhesive available from Aremco Products, Inc., Ossining, N.Y., or a high-temperature epoxy filled with thermally conductive materials such as alumina. The spiral coil is die-cut from a sheet of conducting material. Several nearly identically shaped spiral coils may be advantageously made from the same sheet of conducting material, reducing material costs.

In addition, the element 34 may include a switch inbetween end 38 and strip 40 for opening and closing of the electric circuit created by the coil and strip 40. As a result, the switch may be used for selectively activating and deactivating the element 34.

Referring to FIG. 6, a temperature self-regulating, food warming device 42 is illustrated. The device 42 broadly includes a magnetic induction heater 44 and the food retaining apparatus 10 described above positioned on the heater 44. The heater includes a holder 46 for holding the apparatus 10, a magnetic field generator 48 and a no load or abnormal load detector 50. The generator 48 provides a means for generating a magnetic field through the space above the holder 46. The no load detector 50 provides a means for detecting the impedance of a body positioned on the holder 46 in the magnetic field, and for interrupting the magnetic field when the detected impedance is less than a predetermined value. The operation of detector 50 and interaction with food retaining apparatus 10 are described above.

There are numerous advantages of food warming device 42 over prior art holding/warming devices. The energy efficiency of device 42 will be greater than the prior art devices since power is consumed only when the food retaining apparatus 10, or another inductive heating item, is placed on the holder 46. Furthermore, the heating element 16 will temperature self-regulate the entire core 14 and thus the food retaining apparatus 10 indefinitely while on the heater 44. The user need not worry about thermal runaway of food retaining apparatus 10 since it may be left upon the heater indefinitely, allowing great flexibility of use. Also, the heat retentive core 14 will keep the food hot for an extended period of time after the apparatus 10 has been removed from the heater.

In an alternative configuration, the food warming device 42 includes an insulated, closable metal cabinet for accepting a column, or several columns, of vertically stacked food retaining apparatus 10. The heater 44 is positioned within the cabinet. A lid is provided for closing the cabinet. The magnetic generator of the alternative food warming device includes a magnetic field coil, such as those used in the scanning devices currently being employed in industry to harden metals by magnetic induction. These coils are solenoid shaped with sufficient length to create a nearly uniform magnetic field within the center of the solenoid. The intensity of this magnetic field is increased within the center of the tube by the inherent magnetization of the ferrite material in the dinner plates centered within the induction coil. Electromagnetic shielding to reduce electromagnetic emissions from this device are provided by the metal cabinet and other magnetic shielding methods known in the art.

The coil is driven by a simple worm gear running down the length of the cabinet, infusing several of the food retaining apparatus 10 at once with energy via magnetic induction. This device is able to heat the stack of heat retentive dinner plates relatively efficiently and quickly compared with the 1 to 2 hour time required by oven-type heated base dispensers currently used by most hospitals. Furthermore, the food retaining apparatus 10 are hot only in their center regions, adjacent to the core 14, leaving the rim portion 20 cool to the touch. As a result, unloading and handling the plates is relatively safer than in the prior art.

In a further alternative configuration, the food warming device 42 includes an insulated, closable plastic or metal cabinet for accepting a column, or several columns of vertically stacked food retaining apparatus 10, each positioned upon its own heater 44. A door is provided for closing the cabinet.

In another alternative configuration, the food warming device includes a conveyor belt for transporting a plurality of food warming apparatus 10 between entry and exit positions. Magnetic field generators and no load detectors are positioned along the conveyor so that the food retaining apparatus 10 may be brought to an operating temperature. The device may be designed to accept a plurality of apparatus 10 either stacked horizontally or vertically.

Referring now to FIG. 7, an alternative temperature self-regulating food retaining apparatus 100 is shown in the form of a coffee carafe. The apparatus 100 broadly includes a coffee carafe top 102 and a lower portion 104 threadably coupled with the top 102. The threaded coupling permits separation of the top 102 from the lower portion 104 for cleaning. Of course, the top 102 and lower portion 104 may be alternatively adhesively attached to each other. The lower portion 104 includes a solid sheet heating element 106 for heating of the contents of the apparatus 100.

The heating element 106 is thermally insulated from the non-metallic outside wall of the lower portion 104 via either foam insulation, an air gap, a vacuum space, or any other means of thermal insulation known in the prior art. The coffee carafe top 102 as shown is insulated with double clear plastic walls having an air gap in between. The more well insulated the contents of the apparatus 100, the less energy input from the magnetic induction heater 44 is required to maintain the contents at a constant temperature. Experimentation with a prototype of apparatus 100 whose solid sheet heating element 106 was formed of a single alloy of 73% nickel and 27% copper, was conducted on a Sunpentown International Model SR-1330 magnetic induction cooktop. Experiments showed that temperature regulation occurred at 190±2° F., regardless of the amount of coffee within the apparatus 100. The Sunpentown SR-1330 cooktop interrupted its magnetic field output on average approximately 67% of the time. Thus the cooktop was actively heating the vessel only 33% of the time to maintain a constant temperature.

Experimentation also showed that by raising the apparatus 100 approximately 1/32 inches above the cooktop surface, a hold temperature of 181° F. was achieved. This lowering of hold temperature was possible until the vessel was approximately 1/8 inch above the cooktop surface, at which time the hold temperature was 155° F. The holding temperature/height relationship appears to be linear with a slope of approximately (9° F.)/(height increase of 1/32 inch). Any further raising of height prevented the vessel from triggering the cooktop on, and thus prevented any heating of the vessel at all. This ability to adjust the hold temperature of the vessel by raising it above the cooktop surface (and thus the magnetic induction coil) allows the designed of the coffee maker to include a height adjuster 108 to allow the user to selected the exact hold temperature desired. The height adjuster 108 is simply a threaded cap 110 that serves as a holder for the coffee carafe. The threaded cap 110 is rotated by the user to raise the coffee carafe or lower it above a factory set height so as to lower or raise the coffee holding temperature. Since the hold temperature/height relationship appears to be linear, the cap height adjuster is easily calibrated and factory set for a selected hold temperature.

Figure 9:
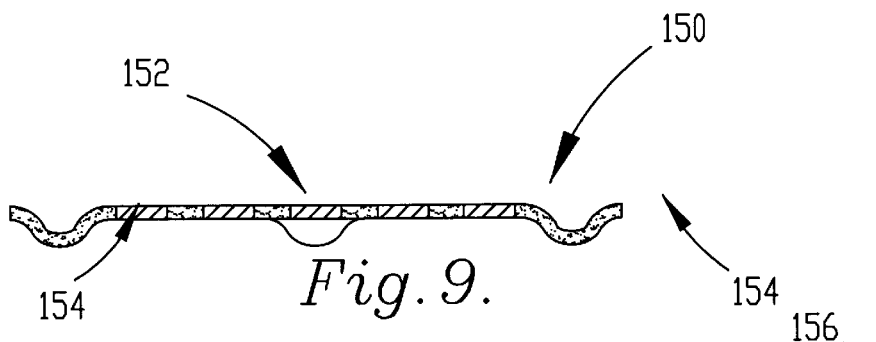
FIG. 9 is a sectional view of the heating element of FIG. 8 taken along line 9—9.

An alternative heating element 150 is configured to be positioned within a food retaining device and is shown in FIGS. 8 and 9. The heating element 150 is generally disc-shaped and includes structure defining a plurality of apertures 152 through the element 150. The element 150 may alternatively be of other shapes and sizes. In addition, a plurality of dimples 154 are formed in the element 150. The dimples 154 act to raise the disc from the floor of the food retaining device so that food within the device is permitted to flow through the apertures 152.

Figure 10:
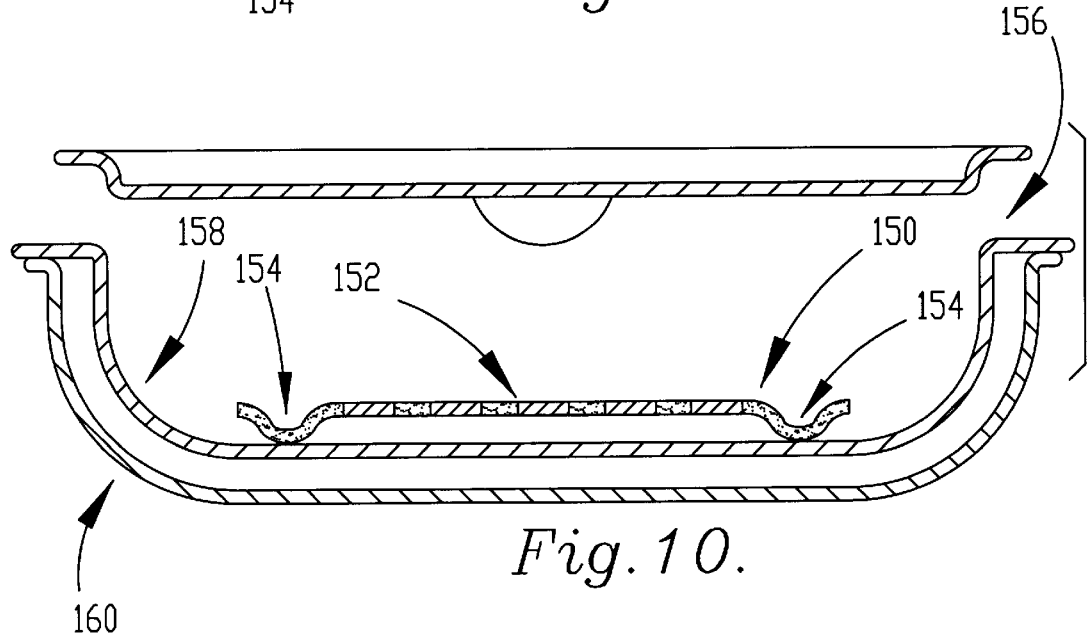
FIG. 10 is a sectional view of a pan including the heating element of FIG. 8.

By providing element 150, food-retaining devices that are otherwise not designed for heating and holding the temperature of food through the use of magnetic induction may be easily converted to magnetic induction food heaters. Furthermore, thermally insulated food retaining devices may be designed to be extremely energy efficient temperature self-regulating holding devices. Referring now to FIG. 10, a typical plastic steam table pan 158 has been converted to a temperature self-regulating, thermally insulated device 156. The heating element 150 is positioned within the pan 158 to permit magnetic induction heating of the contents of the pan 158. The device 156 includes the pan 158 and an outer sleeve 160 spaced from the pan 158.

The sleeve 160 is preferably constructed from a plastic material such as polycarbonate. While the space between the liner 158 and sleeve 160 provides thermal insulation between the contents of the pan 156 and the sleeve 160, further insulation may be obtained by lining or coating the interior surface of the sleeve 160 with a prior art insulation material. One such material is a low emissivity coating, such as that found on film used to thermally insulate office windows. Experimentation using such film available from 3M Corporation has shown that heat losses may be reduced by approximately 25%.

One advantage of the use of heating element 150 in a device such as 156 is that the element may be conveniently removed and washed periodically. This convenient cleaning ability is especially important for water tanks where mineral deposits build up on conventional heating elements over time. Furthermore, due to the magnetic field frequencies employed in magnetic induction cooking devices, typically in the range 20–50 Khz, the ultrasonic vibrations induced in the element 150 act to resist the buildup of mineral deposits, such as lime, and corrosion.

Figure 11:
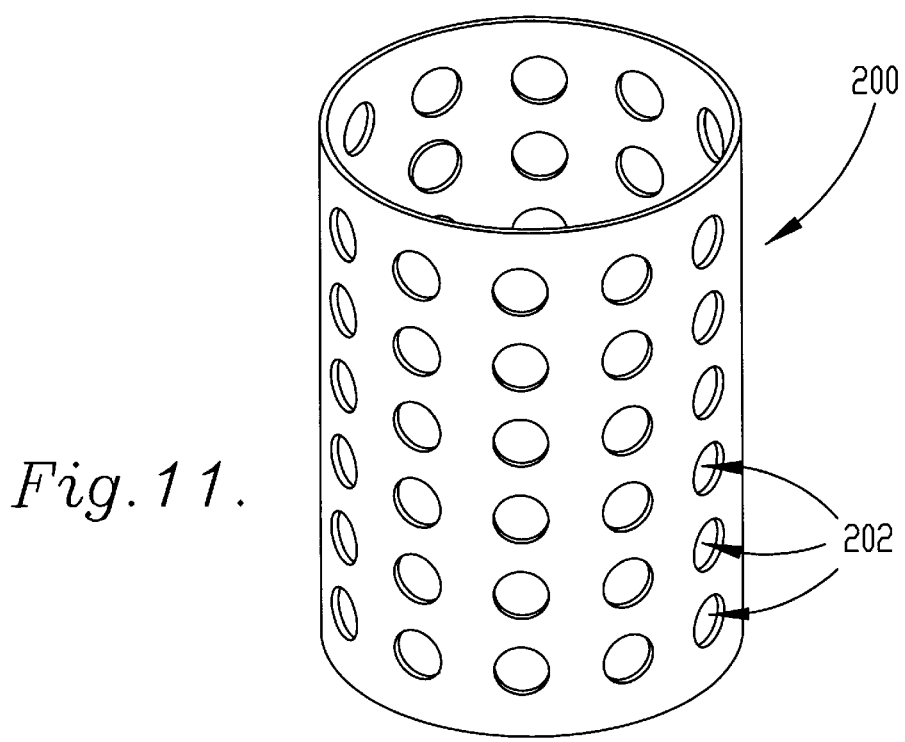
FIG. 11 is a perspective view of a cylindrical heating element constructed in accordance with an alternative embodiment of the present invention.

A cylindrical heating element 200 is shown in FIG. 11. The element 200 includes open upper and lower ends and wall structure defining a plurality of apertures 202 therethrough. The heating element 200 is configured for use in reheating of chilled or frozen foods. For example, prior to cooling the food, the food is placed in a suitable container, such as a poly bag, and the heating element 200 is placed within the food. The food is then reheated simply by positioning it so that the heating element 200 is within a magnetic field for inducing a current in the element 200, heating the element 200 and thus reheating the food. An advantage of reheating food in such a manner is that it may be done in the same container as it was stored. Furthermore, no overheating of the food can occur because of the temperature self-regulation feature of the element 200.

A heat retentive pellet 250 is illustrated in FIG. 12. The pellet includes an encapsulating shell 252, a heat retentive core 254 positioned within the shell 252, and a heating element 256 embedded in the core 254. The core 254 and heating element 256 are comparable with core 14 and element 16, respectively, of the preferred embodiment. As a result, the pellet 250 provides a self-contained unit that is capable of storing latent heat for heating of the area surrounding the pellet 250. The pellet, or a plurality of pellets, may be heated via the food warming device 42 described in the disclosure. Such a pellet is particularly useful when inserted into an insulated food cart, such as that manufactured by Cambro Manufacturing Company. Tests have shown that a pellet 250 prototype containing 500 g of polyol can increase the temperature holding ability of a Cambro 400MPC insulated by more than 50%.

A food warming pot 300 employing several of the features of the present invention is shown in FIG. 13. The pot 300 includes a lid 301, a body 302 and a liner 304 inserted within the body 302. A heating element 306 is provided between the body 302 and liner 304 for magnetic induction heating of the contents of the pot 300. The heating element 306 is similar to element 34 described earlier in this disclosure except that the element 306 is configured to surround the linear 304. By providing the heating element 306 that is configured to surround the majority of the contents of the pot 300, the contents may be more evenly and effectively heated. An insulation material 308 is additionally provided between the body 302 and liner 304 for insulating the pot 300. The insulation material 308 may be constructed from the heat retentive matrix described above, but may also be foam or any other suitable insulator.

As discussed above, the temperature at which self-regulation occurs may be adjusted by varying the distance between the magnetic induction heating element and the magnetic field source. Alternatively, variation in the temperature of self-regulation may be achieved by incorporating a plurality of heating elements, each constructed from material having unique Curie temperatures.

Figure 14:
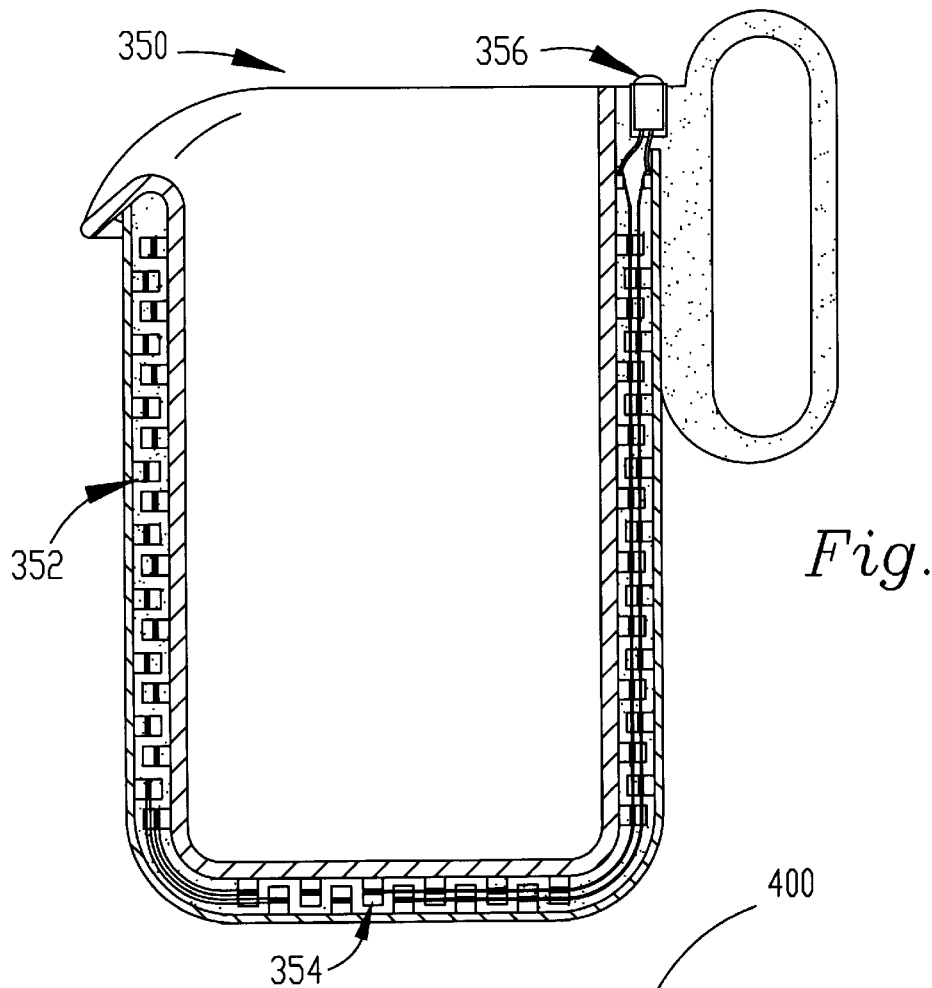
FIG. 14 is an elevational view in partial section of a food warming device constructed in accordance with an alternative embodiment of the present invention.

FIG. 14 illustrates a food container 350 in the form of a beverage pitcher including first and second heating elements 352, 354. The heating elements 352, 354 are similar to element 34 described earlier in this disclosure except that the elements 352, 354 are configured to surround the beverage pitcher. A switch 356 is coupled with each of the elements 352, 354 for selectively opening and closing the circuits defined by the elements 352, 354. As a result, a user may selectively open the circuit of the first element 352 in order to have the container 350 heated to the self-regulation temperature of the second element 354, and vice versa. Therefore, the switch 356 provides a means for adjusting the temperature of self-regulation.

Figure 15:
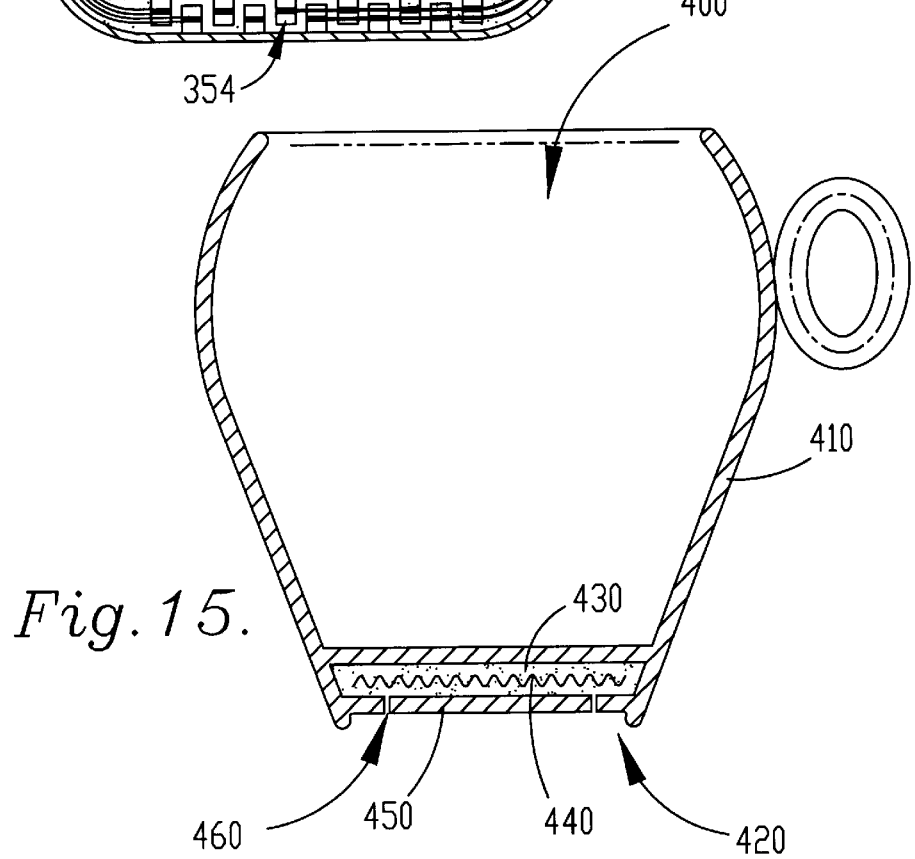
FIG. 15 is a sectional view of a coffee cup constructed in accordance with an alternative embodiment of the present invention.

Referring now to FIG. 15, a coffee or espresso cup 400 is shown constructed in accordance with an alternative embodiment of the present invention. The cup 400 includes a body 410 constructed from ceramic material. The body 410 defines a lower cavity 420. Heat conductive material 430, such as powdered alumina, or the heat retentive matrix of this invention, is positioned within the cavity 420, and a heating element 440 is positioned within the material 430. A lower wall 450 is provided for encapsulating the material 430 and element 440 within the cavity 420. A pair of apertures 460 are formed in the wall 450 and may be sealed by an adhesive, such as Ceramabond 569, available from Aremco Products, Inc. of Ossining, N.Y.

The cup 400 is constructed in a multi step process. First, the body 410 is formed presenting cavity 420. Next, the cup 400 is inverted, and the element 440 is positioned within cavity 420. The lower wall 450 having apertures 460 is then positioned to encapsulate the heating element 440 while permitting air flow between the cavity 420 and the ambient air. At this point, the cup 400 is fired, glazed and fired again. After the cup 400 has cooled, the cavity 420 is filled with the material 430. As noted above, the material 430 is preferably a powdered alumina that exhibits sufficient heat conductivity while preventing excessive expansion during heating of the element 440 so as to prevent cracking of the cup 400. For applications utilizing a material 430 that undergoes significant expansion during heating thereof, a layer of foam may be positioned beneath the material 430 for permitting expansion of the material 430 without cracking of the cup 400. A phase change material, such as that described above, may be substituted for material 430.

Once the material 430 has been positioned within the cavity 420 an adhesive is injected into the apertures 460 for sealing of the apertures 460. Upon curing of the adhesive, the cup 400 is ready for use.

In use, the cup 400 may be heated by magnetic induction prior to being filled with coffee so that the coffee is not cooled by contacting the body 410. For coffees such as espresso, in which the flavor of the coffee is directly related to the temperature of the coffee, the cup 400 may be advantageously used to inhibit an undesired reduction in the temperature of the coffee. Alternatively, the cup 400 may be heated by magnetic induction as it is being filled with espresso, thus regulating the temperature of the espresso until the cup is filled and removed.

The present invention has been described with reference to the illustrated embodiments. It is noted that substitutions and changes may be made and equivalents employed without departing from the scope of the invention as set forth in the claims.

What is claimed is:

1. A food warming device comprising:
   a magnetic induction heater including a holder, means for generating a magnetic field, and impedance detection means for detecting impedance of a body positioned in the magnetic field generated by said generating means, and for interrupting the magnetic field when the detected impedance drops below a predetermined impedance value; and a temperature self-regulating device for retaining food and configured to be positioned on said holder and in the generated magnetic field, said food retaining device including a magnetic induction heating element positioned so as to be in thermal contact with food retained by said device for heating said food to a predetermined temperature, said element including ferromagnetic material responsive to the magnetic field for inducing an electric current in said element to heat said element, said ferromagnetic material having a Curie temperature generally corresponding to said predetermined temperature, and an inherent impedance value when said ferromagnetic material is heated above said Curie temperature, said inherent impedance value being relatively lower than the predetermined impedance value so as to cause said impedance detection means to interrupt the generated magnetic field when said ferromagnetic material of said element is heated above said Curie temperature for regulating the temperature of said food retaining device.

2. The food warming device as set forth in claim 1, said impedance detection means further including means for periodically detecting the impedance of the heating element after interrupting the generated magnetic field for determining when said ferromagnetic material cools below said Curie temperature as represented by the impedance of said element being relatively greater than the predetermined impedance value, and for regenerating the generated magnetic field when said ferromagnetic material cools below said Curie temperature.

3. The food warming device as set forth in claim 1, wherein said heating element is removable from said retaining device.

4. A food retaining apparatus comprising:

food retaining means including a heatable, food-contacting wall;

a first magnetic induction heating element in thermal contact with said wall for heating said wall to a first predetermined temperature, said first element including ferromagnetic material responsive to a magnetic field generated by a magnetic field source for inducing an electric current in said first element to heat said first element to the first predetermined temperature;

a second magnetic induction heating element in thermal contact with said wall for heating said wall to a second predetermined temperature, said second element including ferromagnetic material responsive to the magnetic field generated by the magnetic field source for inducing an electric current in said second element to heat said second element to the second predetermined temperature; and means for selectively disabling one of said first and second elements so that said wall is heated to the predetermined temperature corresponding to the other of said elements.

5. A method of heating a food retaining device comprising the steps of:

positioning a food retaining device including a food-contacting wall and a magnetic induction heating element in thermal contact with the wall in a magnetic field generated by a magnetic field generating means for inducing a current and a corresponding impedance in the heating element and for raising the temperature of the element;

detecting the value of said corresponding impedance of the element with an impedance detection means;

comparing said detected corresponding impedance value with a predetermined impedance value; and interrupting the magnetic field when said detected corresponding impedance value of the element is less than said predetermined impedance value.

6. The method as set forth in claim 5, further including the step of regenerating the magnetic field with the magnetic field generating means when said detected corresponding impedance value of the element is greater than said predetermined impedance value.

7. A method of heating a food retaining device comprising the steps of:

providing a magnetic induction heater including generating means for generating a magnetic field, for detecting impedance of a body positioned in the magnetic field, and for interrupting the magnetic field when either the detected impedance drops below a first predetermined impedance value or the absolute value of the rate of change in the impedance exceeds a predetermined rate of change;

providing a device for retaining food including a magnetic induction heating element positioned to be in thermal contact with food retained by the device for heating the wall to a predetermined temperature;

generating a magnetic field using the generating means;

positioning the food retaining device in the magnetic field for inducing current and a corresponding impedance in the element for heating the element;

detecting said corresponding impedance of the element using the detection means;

comparing the detected corresponding impedance with the first predetermined impedance value;

determining the absolute value of the rate of change in the corresponding impedance value;

comparing the absolute value of the rate of change with the predetermined rate of change; and interrupting the magnetic field when either the detected corresponding impedance value is less than the first predetermined impedance value or the absolute value of the rate of change in the corresponding impedance is greater than the predetermined rate of change.

8. Warming apparatus comprising:

a magnetic induction heater including a magnetic field generator for generating a magnetic field, and an impedance detector for sensing a load impedance parameter of a load magnetically coupled in said magnetic field; and a temperature self-regulating device in position for magnetic coupling with said magnetic field, said device including a ferromagnetic induction heating element, said element responsive to said magnetic field for induction heating of said element to a predetermined temperature;

said impedance detector being operable for periodically sensing said load impedance parameter while said device remains in said position, and in response thereto, altering the magnetic field strength of the magnetic field to a different level when said load impedance parameter is above or below a selected value correlated with said predetermined temperature.

9. The apparatus of claim 8, wherein said device can be moved to a position outside of said magnetic field.

10. The apparatus of claim 8, including an adjuster for adjusting the distance between said device and said magnetic field generator to change said predetermined temperature.

11. The apparatus of claim 8, said device including wall structure operable for holding food, said wall structure being in thermal contact with said element.

12. The apparatus of claim 8, said impedance detector being responsive for reducing the magnetic field strength of the magnetic field to a reduced level when said load impedance parameter is below a selected value correlated with said predetermined temperature and increasing the magnetic field strength of said magnetic field when said load impedance parameter is above said selected value.

13. The apparatus of claim 12, said reduced level of said magnetic field strength being zero.

14. The apparatus of claim 12, said impedance detector operable for maintaining the magnetic field strength of the magnetic field at said reduced level so long as said load impedance parameter is below said selected value.

15. The apparatus of claim 12, said load impedance parameter being the absolute value of the rate of change of an induction heater circuit parameter that depends upon the load impedance, said impedance detector being operable for periodically determining the absolute value of the rate of change of the load impedance of said element and comparing said absolute value with a predetermined rate of change of said circuit parameter and comparing said absolute value with said selected value, and reducing said magnetic field strength to said reduced level when said absolute value is greater than said selected value.

16. The apparatus of claim 8, said load impedance parameter being an induction heater circuit parameter that depends upon the load impedance.

17. The apparatus of claim 8, said load impedance parameter being the magnitude of the induction heating coil current.

18. The apparatus of claim 8, said load impedance parameter being the absolute value of the rate of change of an induction heater circuit parameter that depends upon said load impedance.

19. The apparatus of claim 8, said load impedance parameter being the absolute value of the rate of change of the magnitude of the induction heating coil current.

20. The apparatus of claim 8, said device including solid state phase change heat retentive material in thermal contact with said element.

21. The apparatus of claim 20, including a flexible binder in contact with said material.

22. The apparatus of claim 8, said predetermined temperature being above the Curie temperature of said element.

23. The apparatus of claim 8, said element formed of nickel-copper alloy.

24. The apparatus of claim 8, said selected value being adjustable for changing said predetermined temperature.

25. A method of controlling the temperature of a warming device comprising the steps of:
placing said device in a position for magnetic coupling of said device and a magnetic field generated by a magnetic induction heater, said heater having a magnetic field generator for generating said magnetic field and an impedance detector for sensing a load impedance parameter of a load magnetically coupled in said magnetic field,
said device including a ferromagnetic induction heating element responsive to said magnetic field for induction heating of said element to a predetermined temperature; and
operating said impedance detector to sense periodically said load impedance parameter while said device remains in said position, and in response thereto, altering the magnetic field strength of the magnetic field to a different level when the load impedance parameter is above or below a selected value correlated with said predetermined temperature.

26. The method of claim 25, including the step of adjusting the distance between said device and said magnetic field generator to change said predetermined temperature.

27. The method of claim 25, including the step of adjusting said selected value to change said predetermined temperature.

28. The method of claim 25, said device including wall structure operable for holding food, said wall structure being in thermal contact with said element.

29. The method of claim 25, including the step of reducing the magnetic field strength of the magnetic field to a reduced level when the load impedance parameter is below a selected value correlated with said predetermined temperature, and increasing the magnetic field strength of the magnetic field when said load impedance parameter is above said selected value.

30. The method of claim 29, including the step of reducing said magnetic field strength to zero as said reduced level.

31. The method of claim 29, said load impedance parameter being the absolute value of the rate of change of an induction heater circuit parameter that depends upon the load impedance, said impedance detector being operable for periodically determining the absolute value of the rate of change of said circuit parameter and comparing said absolute value with said selected value, and reducing said magnetic field strength to said reduced level when said absolute value is greater than said predetermined rate of change.

32. The method of claim 29, including the step of maintaining the magnetic field strength of the magnetic field at said reduced level so long as said load impedance is below said selected value.

33. The method of claim 25, said predetermined temperature being above the Curie temperature of said element.

34. The method of claim 25, said load impedance parameter being the magnitude of the induction heating coil current.

35. The method of claim 25, said load impedance parameter being the absolute value of the rate of change of an induction heating parameter that depends upon the load impedance.

36. The method of claim 25, said load impedance parameter being the absolute value of the rate of change of the magnitude of the induction heating coil current.

37. The method of claim 25, said device including solid state phase change heat retentive material in thermal contact with said element.

38. The method of claim 37, including a flexible binder in contact with said material.

39. The method of claim 25, said element formed of nickel-copper alloy.

* * * * *

UNITED STATES PATENT AND TRADEMARK OFFICE
CERTIFICATE OF CORRECTION

PATENT NO. : 5,954,984
DATED : Sep. 21, 1999
INVENTOR(S) : Amil J. Ablah and Brian L. Clothier It is certified that error appears in the above-identified patent and that said Letters Patent is hereby corrected as shown below:

Title page item,

[60] please delete "60/044,074, April 17, 1997" and substitute therefor --60/044,047, April 22, 1997--.

Signed and Sealed this

Twenty-second Day of May, 2001

Attest:

NICHOLAS P. GODICI

Attesting Officer    Acting Director of the United States Patent and Trademark Office

UNITED STATES PATENT AND TRADEMARK OFFICE
CERTIFICATE OF CORRECTION

| | |
|---|---|
| PATENT NO. | : 5,954,984 |
| APPLICATION NO. | : 08/902803 |
| DATED | : September 21, 1999 |
| INVENTOR(S) | : Amil J. Ablah and Brian L. Clothier |

Page 1 of 1

It is certified that error appears in the above-identified patent and that said Letters Patent is hereby corrected as shown below:

Title page item [60], Delete "60/044,074 April 17, 1997" and substitute therefor --60/044,047, April 22, 1997--.

Drawing Sheet item,

Please enter Fig. 16.

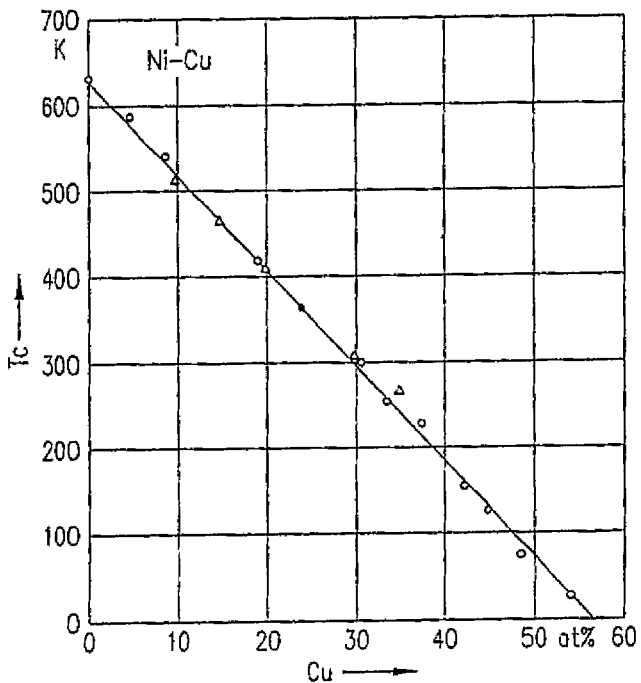

*FIG. 16.*

Signed and Sealed this

Twentieth Day of February, 2007

JON W. DUDAS
*Director of the United States Patent and Trademark Office*